US012792302B1

(12) United States Patent
Mukherjee et al.

(10) Patent No.: US 12,792,302 B1
(45) Date of Patent: Nov. 10, 2026

(54) SYSTEMS AND METHODS FOR BYPASSABLE WATCHPOINT CONTEXTS IN PATTERN MEMORY UNITS

(71) Applicant: SambaNova Systems, Inc., Palo Alto, CA (US)

(72) Inventors: Saubhik Mukherjee, Palo Alto, CA (US); Matthew Feldman, Oakland, CA (US); Kaushik Bharadwaj Manchella, Austin, TX (US)

(73) Assignee: SambaNova Systems, Inc., Palo Alto, CA (US)

( * ) Notice: Subject to any disclaimer, the term of this patent is extended or adjusted under 35 U.S.C. 154(b) by 0 days.

(21) Appl. No.: 19/234,959

(22) Filed: Jun. 11, 2025

(51) Int. Cl.
*G06F 7/36* (2006.01)

(52) U.S. Cl.
CPC .................................... *G06F 7/36* (2013.01)

(58) Field of Classification Search
None
See application file for complete search history.

(56) References Cited

U.S. PATENT DOCUMENTS

2024/0069770 A1* 2/2024 Prabhakar .............. G06F 9/485

FOREIGN PATENT DOCUMENTS

WO 2010142987 A1 12/2010

OTHER PUBLICATIONS

Koeplinger et al., Spatial: a Language and Compiler for Application Accelerators, PLDI '18, Jun. 18-22, 2018, Association for Computng Machinery, 16 pages.

M. Emani et al., Accelerating Scientific Applications With Sambanova Reconfigurable Dataflow Architecture, in Computing in Science & Engineering, vol. 23, No. 2, pp. 114-119, Mar. 26 2021, [doi: 10.1109/MCSE.2021.3057203].

Podobas et al, A Survey on Coarse-Grained Reconfigurable Architectures From a Performance Perspective, IEEEAccess, vol. 2020. 3012084, Jul. 27, 2020, 25 pages.

Prabhakar et al., Plasticine: a Reconfigurable Architecture for Parallel Patterns, ISCA, Jun. 24-28 2017, 14 pages.

* cited by examiner

*Primary Examiner* — Yu Zhao

(74) *Attorney, Agent, or Firm* — FP Patents; Sikander M. Khan; Bruce A. Young

(57) ABSTRACT

A pattern memory unit (PMU) connected to a switch fabric can implement bypassable watchpoint contexts that send scratchpad data from a scratchpad memory in the PMU to the switch fabric in response to receiving a first trigger. The PMU also implements an input context and an output context. The input context writes scratchpad data to the scratchpad memory in response to receiving input data from the switch fabric. The output context reads the scratchpad data from the scratchpad memory and sends output data to the switch fabric in response to receiving a second trigger. Bypassing the bypassable watchpoint context includes intercepting the first trigger and sending the second trigger to the output context without running the bypassable watchpoint context.

20 Claims, 18 Drawing Sheets

```
#Begin Input Context Code
for(i=0....)
  for(j=0...)
    scrachpadData[f(i,j)] =  g(inputData())

sendTrigger(target)

#End Input Context Code
```

FIG. 9A

```
#Begin Output Context Code
for(i=0....)
  for(j=0...)
    outputData( g(scrachpadData[f(i,j)]) )

sendTrigger(targetAddr)

#End Output Context Code
```

FIG. 9B

SYSTEMS AND METHODS FOR BYPASSABLE WATCHPOINT CONTEXTS IN PATTERN MEMORY UNITS

TECHNICAL FIELD

The present disclosure relates to a reconfigurable dataflow architecture for accelerating workloads and, more particularly, to debugging for pipeline optimization during execution of a dataflow graph in a reconfigurable data processor.

BACKGROUND

Data processing and computer science have seen a revolution in learning capability and performance with the advent of artificial intelligence (AI) and machine learning (ML) based on neural networks (NN) as a core topology using parallel processing algorithms. Many AI/ML applications have been performed using conventional computer architectures based on sequential control flow. In sequential control flow, a central processing unit (CPU) sequentially executes an instruction set. However, large AI/ML applications, such as those with large language models (LLMs), may not be particularly well matched with the capabilities of CPU based computer systems.

Therefore, in addition to the CPU, computer systems including a graphics processing unit (GPU) have been used to accelerate the parallel processing involved with AI/ML applications. GPUs that were designed to accelerate graphics output to a display were found to also accelerate the AI/ML applications in a similar manner. The use of CPU/GPU computer systems may provide a limited potential for acceleration of various workloads, and in particular large AI/ML applications, due to constraints with memory access as well as due to overall power consumption, which can be undesirable.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure as a prelude to the more detailed description that is presented later.

An aspect of the subject matter described in this disclosure may be implemented by a system. The system may include a switch fabric, and a pattern memory unit (PMU) configured to implement a bypassable watchpoint context that sends scratchpad data from a scratchpad memory in the PMU to the switch fabric in response to receiving a first trigger, wherein the PMU is configured to implement an input context that writes the scratchpad data to the scratchpad memory in response to receiving input data from the switch fabric, the PMU is configured to implement an output context that reads the scratchpad data from the scratchpad memory sends output data to the switch fabric in response to receiving a second trigger, and bypassing the bypassable watchpoint context includes intercepting the first trigger and sending the second trigger to the output context without running the bypassable watchpoint context.

Yet another aspect of the subject matter described in this disclosure may be implemented in a method. The method may include configuring a pattern memory unit (PMU) to implement a bypassable watchpoint context that sends scratchpad data from a scratchpad memory in the PMU to a switch fabric in response to receiving a first trigger, configuring the PMU to implement an input context that writes the scratchpad data to the scratchpad memory in response to receiving input data from the switch fabric, and configuring the PMU to implement an output context that reads the scratchpad data from the scratchpad memory sends output data to the switch fabric in response to receiving a second trigger, wherein bypassing the bypassable watchpoint context includes intercepting the first trigger and sending the second trigger to the output context without running the bypassable watchpoint context.

Another aspect of the subject matter described in this disclosure may be implemented by a non-transitory computer readable medium storing computer readable instructions, that when executed on one or more processors implements a method that may include configuring a pattern memory unit (PMU) to implement a bypassable watchpoint context that sends scratchpad data from a scratchpad memory in the PMU to a switch fabric in response to receiving a first trigger, configuring the PMU to implement an input context that writes the scratchpad data to the scratchpad memory in response to receiving input data from the switch fabric, and configuring the PMU to implement an output context that reads the scratchpad data from the scratchpad memory sends output data to the switch fabric in response to receiving a second trigger, wherein bypassing the bypassable watchpoint context includes intercepting the first trigger and sending the second trigger to the output context without running the bypassable watchpoint context.

In some implementations of the methods and devices, running the bypassable watchpoint context includes the bypassable watchpoint context sending the scratchpad data to the switch fabric and sending the second trigger to the output context in response to receiving the first trigger. In some implementations of the methods and devices, the system further includes a reorder buffer. A reorder buffer may be configured to receive the scratchpad data sent by the PMU, produce reordered scratchpad data by reordering the scratchpad data, and send the reordered scratchpad data to a consumer. In some implementations of the methods and devices, the reorder buffer is configured to produce the reordered scratchpad data by combining and reordering scratchpad data received from a plurality of PMUs. In some implementations of the methods and devices, the system further includes a second PMU. The second PMU may be configured to implement the reorder buffer by implementing a second input context that writes the scratchpad data to a second scratchpad memory in response to receiving the scratchpad data sent by the PMU, and implementing a second output context that sends the reordered scratchpad data to the consumer via the switch fabric. In some implementations of the methods and devices, the second PMU is configured to produce the reordered scratchpad data by combining and reordering scratchpad data received from a plurality of PMUs. In some implementations of the methods and devices, the system further includes a tile that includes the switch fabric, the PMU, and a communications port that implements the reorder buffer, wherein the communications port is configured to pass data between the switch fabric and a top-level network, and send the scratchpad data to the consumer via the top-level network. In some implementations of the methods and devices, the communications port is configured to produce the reordered scratchpad data by combining and reordering scratchpad data received from a plurality of PMUs.

In some implementations of the methods and devices, the method further includes configuring a reorder buffer to receive the scratchpad data sent by the PMU, produce reordered scratchpad data by reordering the scratchpad data, and send the reordered scratchpad data to a consumer. In some implementations of the methods and devices, the reorder buffer is configured to produce the reordered scratchpad data by combining and reordering scratchpad data received from a plurality of PMUs. In some implementations of the methods and devices, the method further includes configuring a second PMU to implement the reorder buffer by implementing a second input context that writes the scratchpad data to a second scratchpad memory in response to receiving the scratchpad data sent by the PMU, and implementing a second output context that sends the reordered scratchpad data to the consumer via the switch fabric. In some implementations of the methods and devices, the second PMU is configured to produce the reordered scratchpad data by combining and reordering scratchpad data received from a plurality of PMUs. In some implementations of the methods and devices a tile includes the switch fabric, the PMU, and a communications port, the communications port implements the reorder buffer, and the communications port is configured to pass data between the switch fabric and a top-level network, and send the scratchpad data to the consumer via the top-level network. In some implementations of the methods and devices the communications port is configured to produce the reordered scratchpad data by combining and reordering scratchpad data received from a plurality of PMUs.

These and other aspects will become more fully understood upon a review of the detailed description, which follows. Other aspects and features will become apparent to those of ordinary skill in the art, upon reviewing the following description of specific examples in conjunction with the accompanying figures. While features may be discussed relative to certain examples and figures below, any example may include one or more of the advantageous features discussed herein. In other words, while one or more examples may be discussed as having certain advantageous features, one or more of such features may also be used in accordance with the various examples discussed herein. In similar fashion, while the examples may be discussed below as devices, systems, or methods, the examples may be implemented in various devices, systems, and methods.

BRIEF DESCRIPTION OF THE DRAWINGS

FIG. 9A is a diagram illustrating an example of pseudocode implementing an input context, according to some aspects.

FIG. 9B is a diagram illustrating an example of pseudocode implementing an output context, according to some aspects.

Throughout the description, similar reference numbers may be used to identify similar elements.

DETAILED DESCRIPTION

It will be readily understood that the components of the examples as generally described herein and illustrated in the appended figures could be arranged and designed in a wide variety of different configurations. Thus, the following more detailed description of various examples, as represented in the figures, is not intended to limit the scope of the present disclosure but is merely representative of various examples. While the various aspects of the examples are presented in drawings, the drawings are not necessarily drawn to scale unless specifically indicated.

Systems and methods that implement aspects may have various differing forms. The described systems and methods are to be considered in all respects only as illustrative and not restrictive. The scope of the claims is, therefore, indicated by the claims themselves rather than by this detailed description. All changes which come within the meaning and range of equivalency of the claims are to be embraced within their scope.

Reference throughout this specification to features, advantages, or similar language does not imply that any system or method implements each and every aspect that may be realized. Rather, language referring to the features and advantages is understood to mean that a specific feature, advantage, or characteristic described in an example may be implemented in or by at least one example. Thus, discussions of the features and advantages, and similar language, throughout this specification may, but do not necessarily, refer to the same example.

Furthermore, the described features, advantages, characteristics, and aspects may be combined in any suitable manner in one or more systems or methods. One skilled in the relevant art will recognize, in light of the description herein, that one example may be practiced without one or more of the specific features or advantages of another example. In other instances, additional features and advantages may be recognized in one example that may not be present in all the examples.

Reference throughout this specification to "one example", "an example", or similar language means that a particular feature, structure, or characteristic described in connection with the indicated example is included in at least one example. Thus, the phrases "in one example", "in an example", and similar language throughout this specification may, but do not necessarily, all refer to the same example.

Figure 1A:
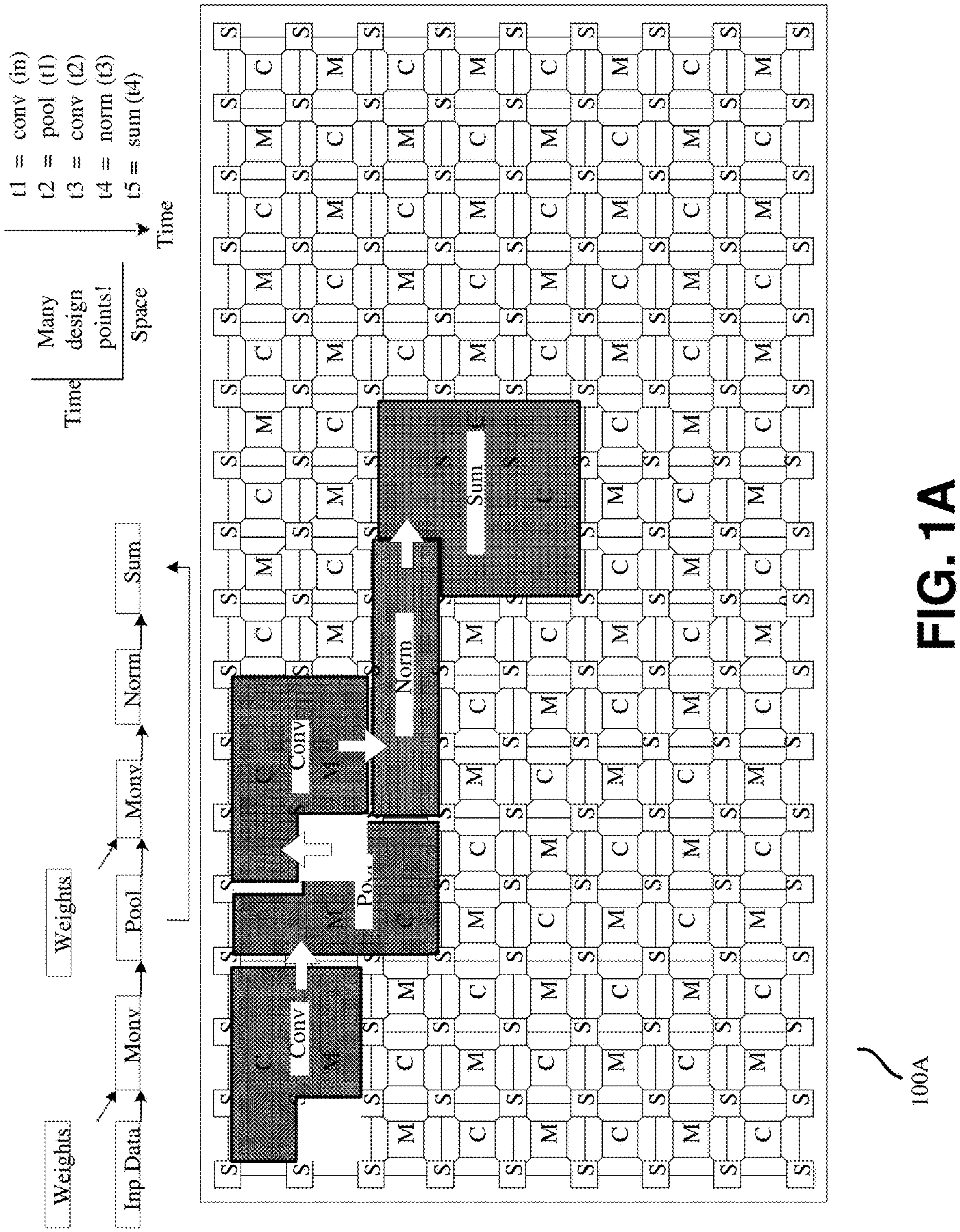
FIG. 1A is a high-level conceptual diagram illustrating an example of a coarse-grained reconfigurable architecture (CGRA) suitable for dataflow computing, according to some aspects.
Figure 3B:
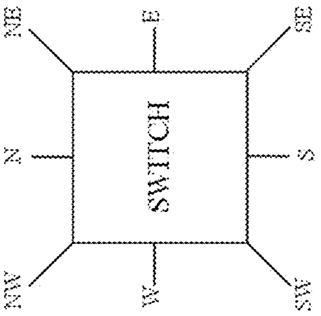
FIG. 3B is a high-level block diagram illustrating an example of a switch unit connecting elements in an array level network, according to some aspects.
Figure 3A:
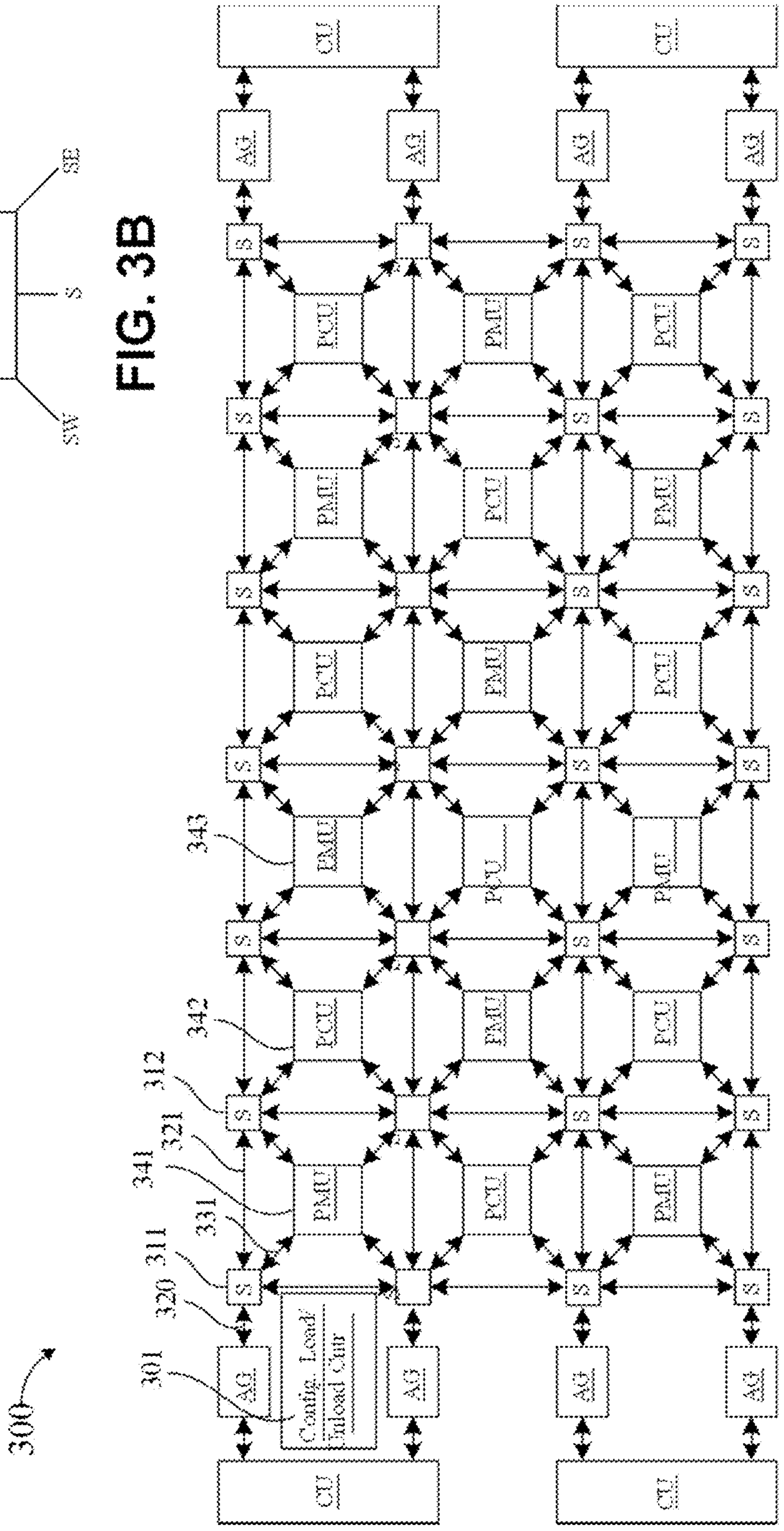
FIG. 3A is a high-level block diagram illustrating an example of a tile and an array level network usable in the configuration of FIG. 2, where the configurable units are nodes on the array level network, according to some aspects.

A tile in a CGRA includes pattern memory units (PMUs) and pattern compute units (PCUs) connected by a switch fabric as shown in FIG. 1A and FIG. 3A. The tile can be configured to implement all or part of an application (e.g., a machine learning model) by loading configuration data into the PMUs, into the PCUs, and into the switch units of the switch fabric. The configuration data may be produced by compiling the application to run in one or more CGRAs. The configuration data maps specific portions of the application to specific PMUs and PCUs. Debugging the application is difficult because the application's intermediate data is stored as scratchpad data within the scratchpad memories of the PMUs. It is difficult to debug an application without observing the contents of the scratchpad memories. As such, the application may include debugging code that, when compiled, configures certain PMUs to output scratchpad data from their scratchpad memories. Once debugged, the application may be put into production. However, the debugging aspects consume system resources. Removing the debugging aspects frees those resources and results in the application running more quickly, consuming less power, etc. However, removing the debugging aspects typically requires recompiling the application with the debugging aspects omitted. Recompiling without the debugging aspects can change the mapping between the portions of the application and the hardware (e.g., the PMUs and PCUs), thereby introducing different bugs. These are sometimes called heisenbugs because they disappear when the debugging code is used. A solution is to implement bypassable watchpoint contexts in the PMUs.

A PMU can be configured to perform part of the application by implementing input contexts and output contexts in accordance with the configuration data. An input context may iterate through data received by the PMU from the switch fabric, optionally apply an intake function to that data, and write scratchpad data to the PMU's scratchpad memory. The scratchpad data may include the received data, the result of applying the inflow function to the received data, or both. An output context may iterate through the scratchpad data, optionally apply an outflow function to that data, and send output data to the switch fabric. The output data may include the scratchpad data, the result of applying the outflow function to the scratchpad data, or both. In many cases, the scratchpad data is not available for debugging because the output data does not include the scratchpad data.

For debugging, a PMU can be configured to implement a bypassable watchpoint context in accordance with the configuration data. A bypassable watchpoint context can send scratchpad data to the switch fabric during debugging and can be bypassed otherwise. The application is compiled to produce configuration data that configures the PMUs to implement a bypassable watchpoint context that can be enabled and disabled. In an example, the bypassable watchpoint context includes an iterator (e.g., a for loop) that sends scratchpad data to the switch fabric. The iterator is run when the bypassable watchpoint context is enabled and is not run when the bypassable watchpoint context is disabled. The bypassable watchpoint context may be enabled or disabled by changing a parameter in the configuration data. As such, the mapping between the portions of the application and the hardware (e.g., the PMUs and PCUs) does not change when debugging is enabled or disabled.

In an example, the PMUs, PCUs, switch fabric, and tiles are elements in a coarse-grained reconfigurable processor (CGRP) that may be configured using data graphs (e.g., deep learning graphs) that are compiled and translated into configuration files. The configuration files are loaded onto arrays of PCUs and PMUs in the tiles. The CGRPs then process the data flow graphs during which the PCUs execute the read and write tasks for performing computations and the PMUs provide pipelined data paths to the neighboring PCUs for the tasks to be performed.

Figure 5:
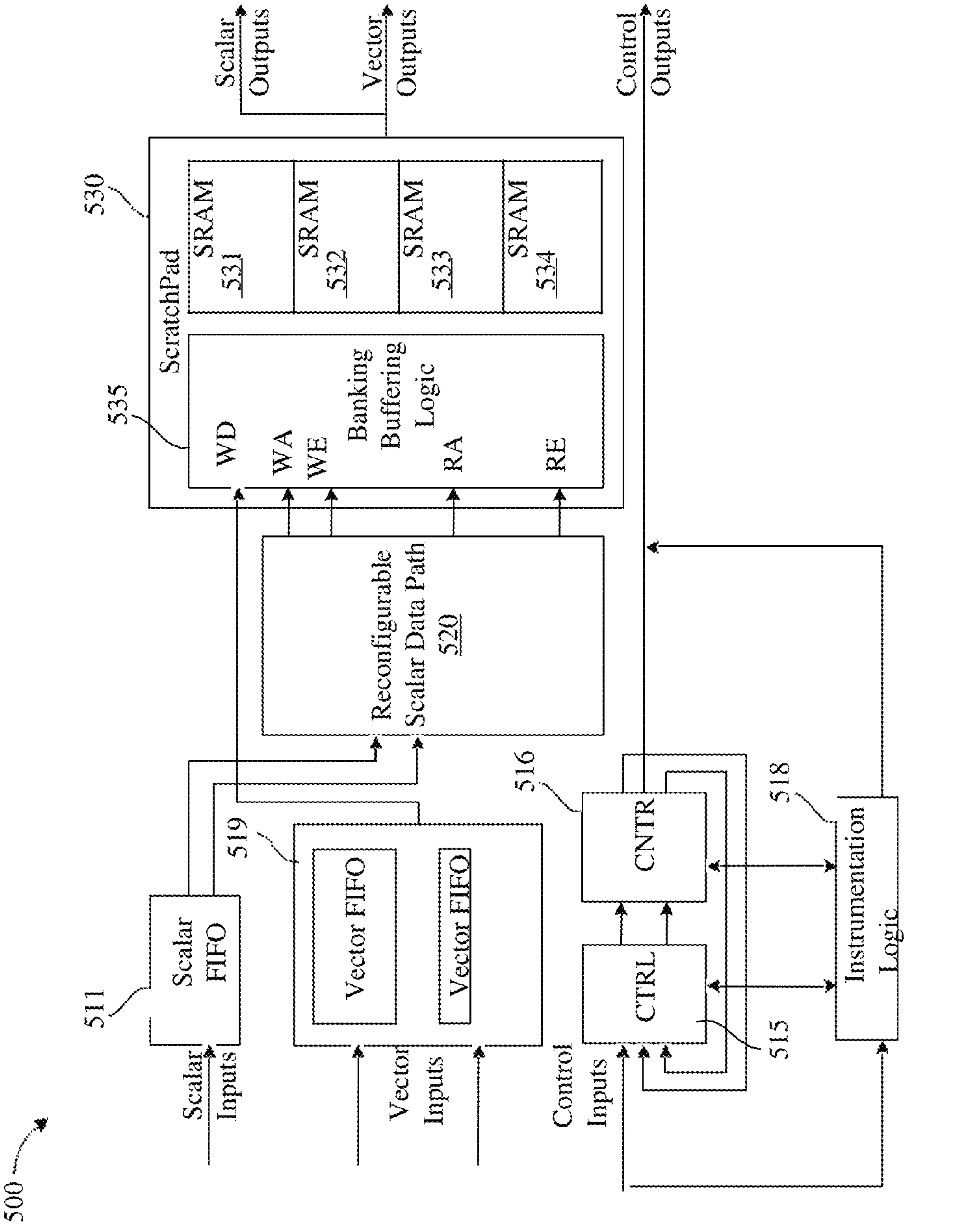
FIG. 5 is a high-level block diagram illustrating an example of a pattern memory unit (PMU), according to some aspects.

In an example, the read and write memory accesses that occur during the execution of a graph may be initially represented by a user in the form of tensors (Tbuffers) which show the logical memory address space that is mapped to a physical memory address space. The physical memory space is the scratchpad memories in the PMUs. FIG. 5 illustrates an example in which the scratchpad memory 530 is implemented as banks of SDRAM 531, 532, 533, 534 in a PMU. As such, the compiler determines how to allocate the tensor data to those PMUs in parallel such that the tile can process the data in an efficient manner. Processing the data in an efficient manner may include sending relevant data to the relevant PMUs in parallel.

Disclosed herein is a technology, which performs non-overlapping parallelization of data in a user's program memory (also known as "logical memory") to the CGR memory in the form of PMUs (also known as “physical memory.”) The data in the user’s program memory is represented in the form of tensors. In other words, disclosed herein are systems and methods to perform a logical-to-physical mapping of tensor data and the analysis required to compute this logical-to-physical mapping. The major components of the technology include: memory access analysis to formulate the problem in the polyhedral model using polytopes; assignment of memory accesses into a global dispatch space; tensor trimming analysis to minimize the memory footprint of each dispatch; resource-saving optimizations to implement the schemes most efficiently on the PMU architecture (predication+minmax); and pacing window analysis to determine the granularity that packets should be sent between the data PMUs and a reorder buffer (ROB) such that those arrive at the ROB in order.

The following definitions may clarify this detailed description:

Tensor Indexing Expression: A block of source code that references a tensor and specifies indexing operations for accessing the tensor and performing corresponding mathematical operations. The source code could be high-level user-specified source code or a compiler-generated intermediate representation thereof.

Logical memory: Memory referenced in a user program such as memory referenced by tensor indexing expressions.

Compute unit: A processor that performs mathematical operations on tensors. The processor may be vectorized and operate on an entire vector or submatrix (e.g., in a single cycle). It may also be referred to as a ‘pattern compute unit’ (PCU).

Memory unit: A block of scratchpad memory typically used for sourcing and receiving tensor computations. As described elsewhere herein, memory units are assumed to operate cooperatively with compute units and may be provided with an address generator to generate a pattern of read/write memory addresses to facilitate sourcing data to, and/or receiving data from, compute units. It may also be referred to as a ‘pattern memory unit’ (PMU).

Switch/communication fabric: An array of switch units that interconnect arrays of compute units and arrays of memory units and enables the routing of tensor data between compute units, memory units and external ports.

Logical banking/partitioning solution: A memory banking/partitioning solution that maps to ‘logical/virtual’ memory units (e.g., PMUs) of unlimited size. May also be referred to as a virtual banking/partitioning solution.

Physical banking/partitioning solution: A memory banking/partitioning solution that maps to physical memory units (e.g., PMUs) of limited size.

Banking/partitioning solution: A memory banking/partitioning solution which could be ‘logical/virtual’ or ‘physical’.

RAIL: reconfigurable dataflow unit (RDU) abstract intermediate language.

RAIL banking: This refers to the logical partitioning of TBuffers into one or more PMUs based on parallel/concurrent access patterns.

Resource Demand: The quantity of resources required (e.g., number of read ports or write ports) for unhindered computation and dataflow.

Resource Conflict: A situation where the required resources exceed the available or allocated resources.

Reader: A read access pattern which is mapped to a user’s logical memory address space in a tensor.

Writer: A write access pattern which is mapped to a user’s logical memory address space in a tensor.

Reorder Buffer (ROB): A buffer used to put two read data portions in the correct order.

Duplicate gang: A group of duplicates that are chained together by duplicate-merging ROBs.

FIGS. 1A-1C, 2-5 show one example of an environment in which bypassable watchpoint contexts can be deployed and provide more information on compute units, memory units and address generators.

FIG. 1A is a high-level conceptual diagram illustrating an example of a coarse-grained reconfigurable architecture (CGRA) suitable for dataflow computing, according to some aspects. The CGRA includes compute units (e.g., PCUs), memory units (e.g., PMUs), and a switch fabric interleaved into a computing grid 100A. The compute units are shown as boxes labeled “C”. The memory units are shown as boxes labeled “M”. The boxes labeled “S” are the switch units of the switch fabric. The switch units pass data into, through, and out of the computing grid 100A. The compute units and memory units as well as address generation units (not shown in FIG. 1A) may be reconfigurable units that support dataflow computing. A computational unit referred to as a Reconfigurable Dataflow Unit (RDU) may include one or more instances of the computing grid 100A along with some external communication ports (not shown).

The architecture, configurability and dataflow capabilities of the CGRA enables increased computing power that supports both parallel and pipelined computation. Consequently, the CGRA represents a computing paradigm shift that provides unprecedented processing power and flexibility. Leveraging the parallel, pipelined, and reconfigurable aspects of the CGRA adds new dimensions of complexity that require a fundamentally new instruction compilation process and software stack.

While traditional compilers sequentially map operations to processor instructions, typically without regard to pipeline utilization and duration (a task usually handled by the hardware), the coarse-grained reconfigurable computing grid requires mapping operations to processor instructions in both time and space. Furthermore, while communication through the memory hierarchy of traditional (e.g., von Neumann) computers is implicitly sequential and handled by hardware, dataflow compilers map both sequential (including pipelined) operations and parallel operations to instructions in time and in space and may also program the communication between the compute units and memory units.

The example illustrated in FIG. 1A shows machine learning operations typically performed on images. The machine learning operations include two stages of convolution that are augmented with a pooling stage, a normalization stage, and a summing stage. One skilled in the art will appreciate that the depicted stages may be used as a highly efficient image processing pipeline. One skilled in the art will also appreciate that other operations and tasks may be executed in parallel to the depicted operations and that the allocation of resources must be spatially and temporally coordinated. Consequently, compiler (and optionally programmer) assignment of compute and memory resources to the various stages of processing (both spatially and temporally) has a direct effect on resource utilization and system performance.

Figure 1B:
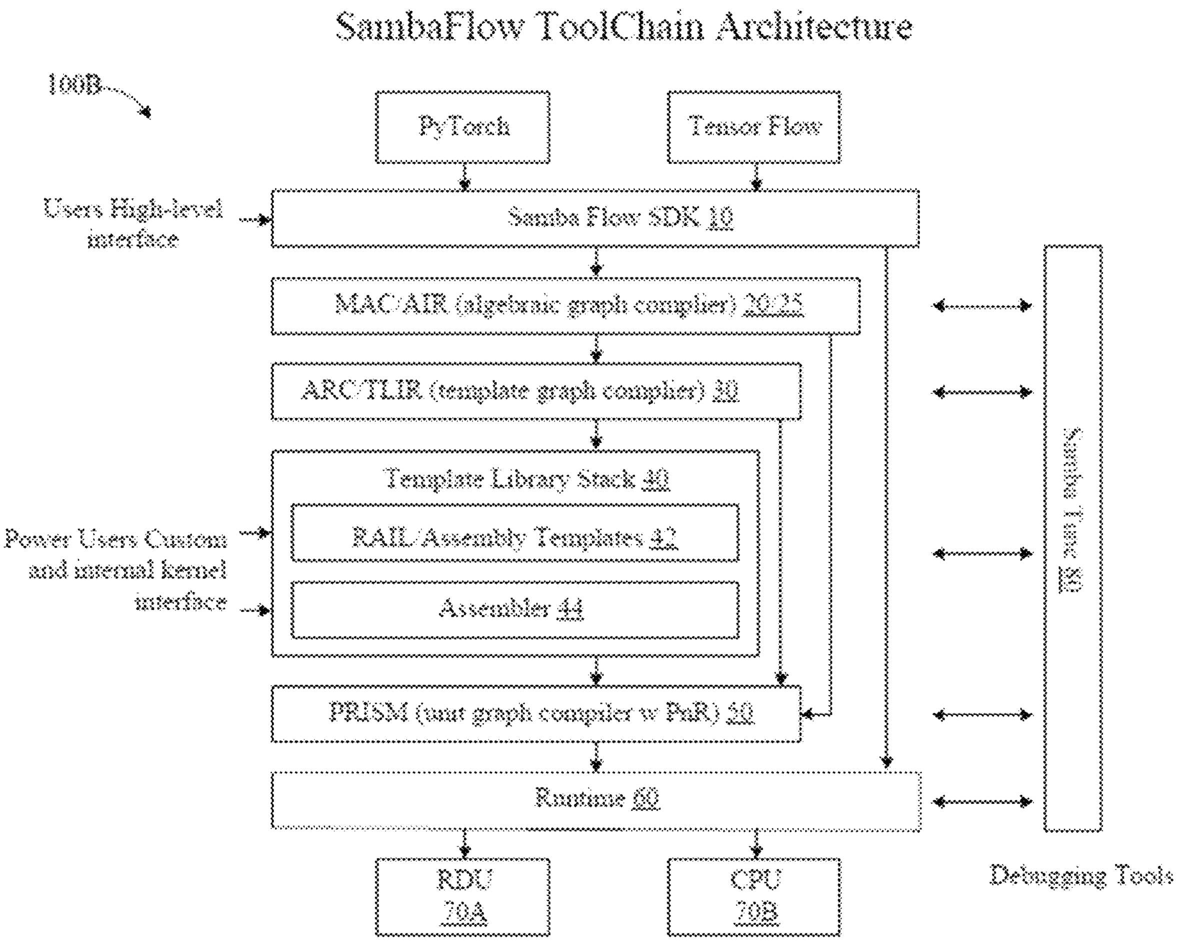
FIG. 1B is a high-level block diagram illustrating an example of a compiler stack suitable for a coarse-grained reconfigurable architecture (CGRA), according to some aspects.

FIG. 1B is a high-level block diagram illustrating an example of a compiler stack 100B suitable for a coarse-grained reconfigurable architecture (CGRA), according to some aspects. The compiler stack 100B includes a number of stages or levels that convert high-level algorithmic expressions and functions (e.g., PyTorch and TensorFlow expressions and functions) to configuration data and instructions for the reconfigurable units of the CGRA.

The SambaFlow SDK 10 converts user selected and configured algorithms and functions from high-level libraries such as PyTorch and TensorFlow to computational graphs. The nodes of the computational graphs are intrinsically parallel unless a dependency is indicated by an edge in the graph.

The Model Analyzer and Compiler (MAC) 20 makes high-level mapping decisions for the computational graphs (and sub-graphs thereof) based on hardware constraints. The MAC may support various application frontends such as Samba, JAX, and TensorFlow/HLO. The MAC may also transform the graphs via autodiff and GradNorm, perform stitching between sub-graphs, interface with template generators for performance/latency estimation, convert Samba operations to Arithmetic/Algebraic Intermediate Representation (AIR) operations, perform tiling, sharding and section cuts and model/estimate the parallelism that can be achieved on the computational graphs.

The AIR operations 25 translate high-level graph and mapping decisions provided by the MAC level into explicit Template Library Intermediate Representation (TLIR) graphs. The key responsibilities of the AIR operations 25 include legalizing the graph and mapping decisions of the MAC, expanding data parallel, tiling, metapipe, region, and hypersection instructions provided by the MAC, converting AIR operations to TLIR operations, inserting stage buffers and skip buffers, eliminating redundant operations, buffers and sections and optimizing for resource use, latency, and throughput.

The ARC level 30 translates mid-level (e.g., TLIR) graphs provided by AIR into Prism source code optimizing for the target hardware architecture and legalizes the dataflow graph through each performed step. The translating is accomplished by converting intermediate representation (IR) operations to appropriate Prism/RAIL templates, stitching templates together with dataflow and control-flow, inserting necessary buffers and layout transforms, generating test data and optimizing for resource use, latency, and throughput.

The template library stack 40 (also called the RAIL layer) provides a library of templates 42 and functions to leverage those templates. The templates 42 are containers for common operations. Templates may be implemented using Assembly or RAIL. While RAIL is similar to Assembly in that memory units and compute units are separately programmed, RAIL provides a higher level of abstraction and compiler intelligence via a concise performance-oriented Domain Specific Language (DSL) for RDU templates. RAIL enables template writers and external power users to control the interactions between the logical compute units and memory units with high-level expressions without the need to manually program aspects such as capacity splitting, register allocation, etc. The logical compute units and memory units also enable stage/register allocation, context splitting, transpose slotting, resource virtualization and mapping to multiple physical compute units and memory units (e.g., PCUs and PMUs). RAIL also enables event handler allocation.

The Assembler level 44 provides an architecture agnostic low-level programming model as well as optimization and code generation for the target hardware architecture. The assembler may perform operations that include address expression compilation, intra-unit resource allocation and management, legalization with target-specific rules, low-level architecture-specific transformations and optimizations, and architecture-specific code generation.

The Prism layer 50 translates ARC template graphs to a physical chip mapping, generates code for the target hardware architecture, legalizes and lowers dataflow graphs to the physical network (e.g., PCUs, PMUs and switch units) and produces Processor Executable Format (PEF) files. The Prism layer 50 also conducts place and route by generating bandwidth calculations, determining the placement of PMUs and PCUs, allocating address generation and coalescing units (AGCUs) and Virtual Address Generators (VAGs), selecting PCM/PCU ports and generating configuration information for compute grid switches to enable data routing.

The runtime layer 60 controls execution of the physical level dataflow graphs on actual hardware such the RDU 70A and/or CPU 70B. SambaTune 80 is a set of debugging tools that can facilitate users to perform deadlock and performance debugging RDUs. SambaTune 80 can summarize and visualize instrumentation counters from the RDU that can guide users to identify performance bottlenecks and eliminate them by tuning various control parameters.

The python runtime executable, libraries, assemblers, and compilers are examples of processes implemented using executable code. As is well known in the art, executable code includes computer readable instructions that, when executed by one or more processors, implement processes and methods such as those illustrated in FIG. 2. As is well known in the art, the computer readable instructions are often stored in a non-transitory computer readable medium (e.g., solid state disk, hard drive, flash drive, etc.) such that they may be read by one or more processors to thereby implement the methods and processes. In an example, a processor executes computer readable instructions that implement runtime 60. Runtime 60 may read a configuration file from a non-transitory computer readable medium and download the configuration file to the RDU 70A. In an example, the configuration file includes data and computer readable instructions that, when loaded into a PMU, configure the PMU to implement iterators such as input contexts, output contexts, and bypassable watchpoint contexts. In an example, a PMU includes an arithmetic logic unit (ALU) and memory for storing computer readable instructions that the ALU executes to thereby implement all or some of an iterator.

Referring now to FIG. 1C through FIG. 5 generally, a tile of a coarse-grain reconfigurable architecture (CGRA) is based on an array of fused compute-memory units (FCMUs), pattern memory units (PMUs), and/or pattern compute units (PCUs) arranged in two dimensions, M×N. Unless clearly noted from context, any reference to a FCMU, PCU, or PMU may refer to one or more of the other units. The communication between a set of FCMUs is performed over a (M+1)×(N+1) switch fabric called the array-level network (ALN) where each switch unit has connections to its neighboring FCMUs and to neighboring switches in each of the four directions.

In an example, the ALN includes three physical networks-vector, scalar and control. The vector network and scalar networks are packet switched whereas the control network is circuit switched. Each vector packet includes a vector payload and a header that includes information such as the packet's destination, sequence ID, virtual channel (aka flow control class) etc. Each scalar packet contains a payload field (e.g., 32-bit representation of a number) and a header that includes information such as the packet's destination and the packet's type. The control network includes a set of single bit wires where each wire is pulsed to transmit a specific control token providing distributed control to orchestrate the execution of a program across multiple FMCUs. The scalar network may also carry control information by overloading a scalar packet using its packet type field.

Parallel Applications such as Machine Learning, Analytics, and Scientific Computing require different types of communication between the parallel compute units and the distributed or shared memory entities. These types of communication can be broadly classified as point-to-point, one-to-many, many-to-one, and many-to-many. The ALN may provide these communication types through a combination of routing, packet sequence ID and flow control.

In an example, the mechanisms for routing packets on the vector and scalar networks includes 2D Dimension Order Routing (DOR) and a software override using flows. Flows can be used for multiple purposes such as to perform overlap-free routing of certain communications and to perform a multicast from one source to multiple destinations without having to resend the same packet, once for each destination.

Sequence ID based transmissions allow the destination of a many-to-one communication to reconstruct the dataflow order without having to impose restrictions on the producer/s. The packet switched network provides flow control classes that include end to end flow control and local flow control. In end to end flow control, a packet is released by a producer only after ascertaining that the consumer has space for it. In local flow control, a packet is released into the network without knowing if the receiver has space for it. Local flow control packets are used for performance critical communication where a non-overlapping route can be provided between the producer and consumer.

ALN switch units are core components of the ALN. A packet or control pulse enters the ALN through an interface between the producer (e.g., a PMU, PCU, FCMU, etc.) and one of its adjacent switch units. While in the ALN, the packet/pulse takes some number of hops until it reaches a switch unit adjacent to the consumer (e.g., a PMU, PCU, FCMU, etc.) where it is passed into an interface of the consumer, thereby completing the route.

In an example, a packet reaching a switch unit's input port is first inspected to see if it should be dimension order routed or flow routed. If it is dimension order routed, the destination ID is mapped to a unique output port. If it is flow routed, the flow ID of the incoming packet is used to index into a table that identifies the output ports to route the packet to. In an example, the switch always allows end to end flow controlled packets to make forward progress and may conditionally delay a local flow controlled packet in accordance with blocking conditions for the local flow controlled packet.

Figure 1C:
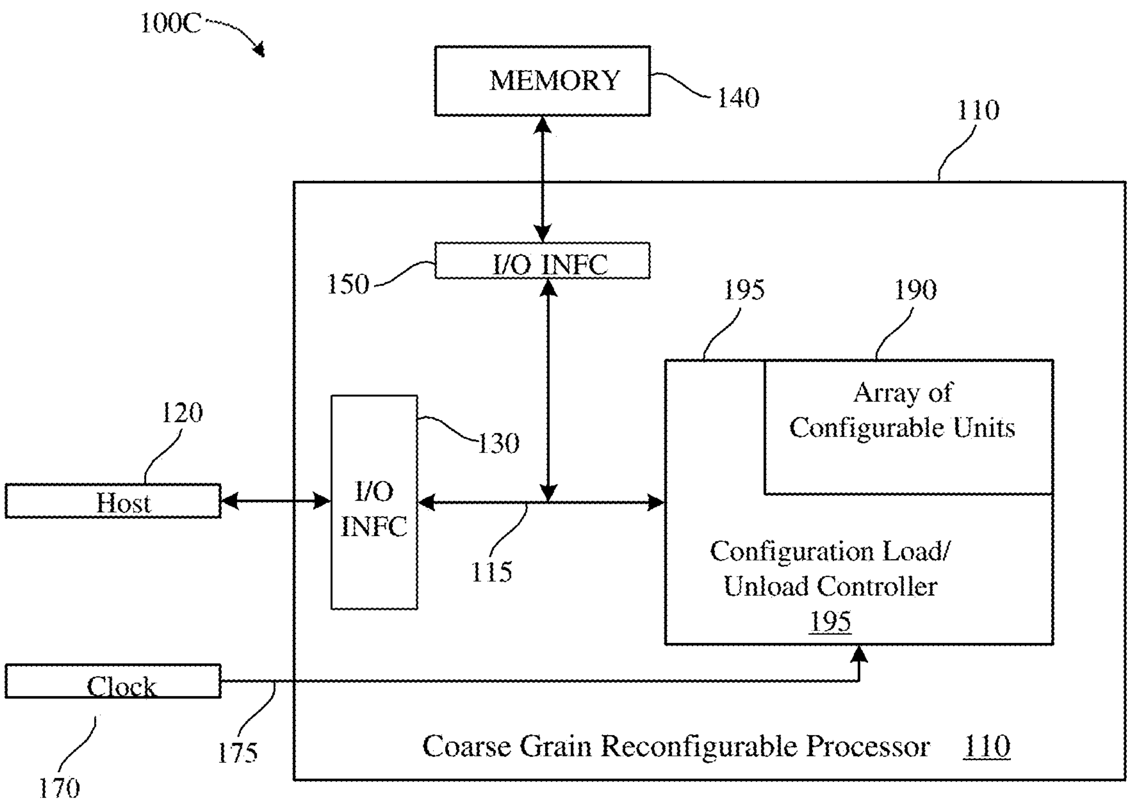
FIG. 1C is a high-level conceptual diagram illustrating an example of a system including a host, a memory, and a coarse-grained reconfigurable (CGR) processor, according to some aspects.

FIG. 1C is a high-level conceptual diagram illustrating an example of a system 100C including a host 120, a memory 140, and a coarse-grained reconfigurable processor 110 (CGRP), according to some aspects. The CGRP 110 includes an array 190 of configurable units and a configuration load/unload controller 195. In the example, the configuration load/unload controller 195 includes a configuration load controller and a configuration unload controller. In other examples, the configuration load controller and the configuration unload controller may be separate. The configuration load controller and the configuration unload controller may be implemented using separate logic and data path resources or may be implemented using shared logic and data path resources. In some, a system may include only a configuration load controller. In some examples, a system may include only a configuration unload controller.

The CGRP 110 includes a first external I/O interface 130 connected to the host 120, and a second external I/O interface 150 connected to the memory 140. The external I/O interfaces 130, 150 connect via a bus system 115 to the array 190 of configurable units and to the configuration load/unload controller 195. The bus system 115 may have a bus width that carries one chunk of data (e.g., 128 bits). In general, a chunk of the configuration file can have N bits of data, and the bus system can be configured to transfer N bits of data in one bus cycle, where N is any practical bus width. A sub-file distributed in the distribution sequence can consist of one chunk, or other amounts of data as suits a particular example. Procedures are described herein using sub-files consisting of one chunk of data each. Of course, the technology can be configured to distribute sub-files of different sizes, including sub-files that may consist of two chunks distributed in two bus cycles for example.

In an example, the host 120 sends a configuration file to the memory 140 via the first external I/O interface 130, the bus system 115, and the second external I/O interface 150. The configuration file is then loaded from the memory 140 into the CGRP 110. The configuration file may be loaded into the CGRP via data paths external to the CGRP, via data paths internal to the CGRP 110 (e.g., via the bus system 115 and the second external I/O interface 150), etc. Chunks of the configuration file can then be sent in a distribution sequence as described herein to configurable units in the array 190 of configurable units in the CGRP 110. An external clock generator 170 or other clock signal sources can provide a clock signal 175 or clock signals to elements in the CGRP 110, including the array 190 of configurable units, the bus system 115, and the external data I/O interfaces 130 and 150.

Figure 2:
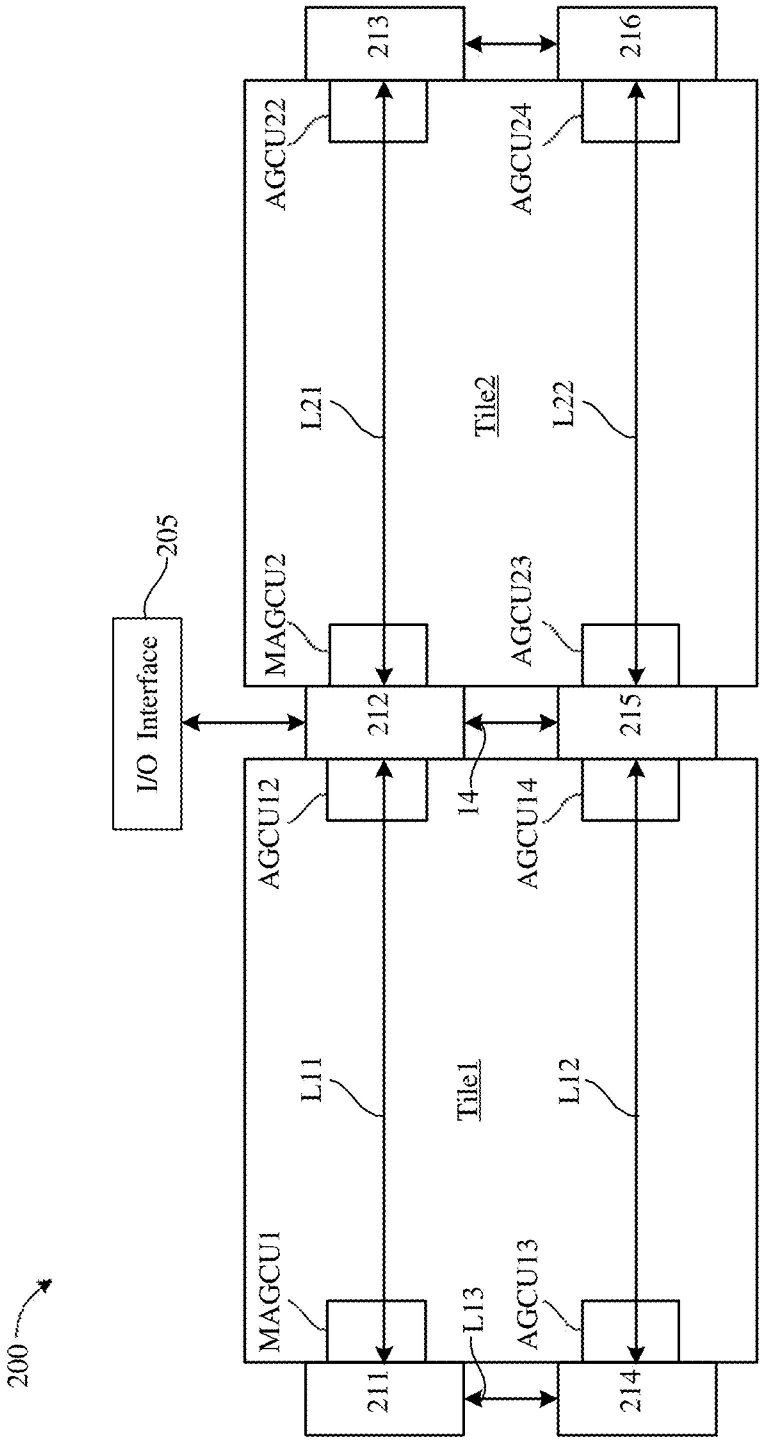
FIG. 2 is a high-level block diagram illustrating an example of top-level network (TLN) and components of a coarse-grained reconfigurable processor (CGRP), according to some aspects.

FIG. 2 is a high-level block diagram illustrating an example of a top-level network (TLN) and components of a CGRP 200, according to some aspects. The CGRP 200 includes a bus system and tiles (e.g., Tile1, Tile2) that each include an array of configurable units (e.g., PCUs, PMUs, etc.) and an ALN. The bus system includes a top-level network connecting the tiles to external I/O interface 205 (or any number of interfaces). Other examples may use different bus system configurations. The configurable units in a tile are nodes on the tile's ALN.

Each tile in the example has four address generation and coalescing units (AGCUs) (e.g., MAGCU1, AGCU12, AGCU13, AGCU14). The AGCUs are nodes on the top-level network and are also nodes on the ALNs. The AGCUs include resources for routing data among nodes on the top-level network and nodes on the ALN in each tile. Nodes on the top-level network include interfaces such as I/O interface 205. The interfaces include resources for routing data among nodes on the top-level network and to external devices, such as high-capacity memory, host processors, other CGRA processors, FPGA devices and so on, that are connected to the interfaces.

In the example, one of the AGCUs in each tile is configured as a master AGCU (e.g., MAGCU1, MAGCU2) that includes an array configuration load/unload controller for the tile. Other examples may include additional array configuration load/unload controllers. Yet other examples include a configuration load/unload controller that is implemented by circuitry distributed among more than one AGCU. MAGCU1 includes a configuration load/unload controller for Tile1, and MAGCU2 includes a configuration load/unload controller for Tile2. In some examples, a configuration load/unload controller can be designed for loading and unloading configurations for more than one tile. In some other examples, more than one configuration controller can be designed for configuration of a single tile. Additionally, configuration load/unload controllers may be implemented in other portions of the system, including as a stand-alone node on the top-level network and the ALN or networks.

The top-level network includes top-level switches 211, 212, 213, 214, 215, 216 that connect to each other as well as to other nodes on the top-level network such as the AGCUs and the I/O interface 205. The top-level network includes links (e.g., L11, L12, L21, L22) that connect the top-level switches to each other. Data travels in packets between the top-level switches on the links, and from the switches to the nodes on the network connected to the switches. For example, top-level switches 211 and 212 are connected by a link L11, top-level switches 214 and 215 are connected by a link L12, top-level switches 211 and 214 are connected by a link L13, and top-level switches 212 and 213 are connected by a link L21. The links can include one or more buses and supporting control lines, including for example a chunk-wide bus (vector bus). For example, the top-level network can include data, request, and response channels operable in coordination for transfer of data in a manner analogous to an AXI compatible protocol. See, AMBA® AXI and ACE Protocol Specification, ARM, 2017. Top-level switches can be connected to AGCUs. For example, top-level switches 211, 212, 214 and 215 are connected to MAGCU1, AGCU12, AGCU13 and AGCU14 in the tile Tile1, respectively. Top-level switches 212, 213, 215 and 216 are connected to MAGCU2, AGCU22, AGCU23 and AGCU24 in the tile Tile2, respectively. Top-level switches can be connected to one or more external I/O interfaces (e.g., interface 205).

FIG. 3A is a high-level block diagram illustrating an example of a tile and an array level network (ALN) usable in the configuration of FIG. 2, where the configurable units are nodes on the array level network, according to some aspects. In this example, the array of configurable units 300 includes a plurality of types of configurable units. The types of configurable units in this example include PCUs, PMUs, switch units(S), and AGCUs. The switch units are shown as boxes labeled "S". In this example, the AGCUs each include a coalescing unit and two address generators that share the coalescing unit. The coalescing units are shown as boxes labeled "CU". The address generators are shown as boxes labeled "AG". The configurable units 300 contain a configuration store comprising a set of registers or flip-flops that represent either the setup or the sequence to run a program, and can include the number of nested loops, the limits of each loop iterator, the instructions to be executed for each stage, the source of the operands, and the network parameters for the input and output interfaces. Examples of such configurable units are discussed in the publication Prabhakar et al., "Plasticine: A Reconfigurable Architecture For Parallel Patterns", ISCA '17, Jun. 24-28, 2017, Toronto, ON, Canada. As such, those practiced in the art are familiar with configurable units that may be included in a tile.

Additionally, each of these configurable units contains a configuration store comprising a set of registers or flip-flops that store status usable to track progress in nested loops or otherwise. A configuration file contains data representing the initial configuration, or starting state, of each of the components that execute the program. Program load is the process of setting up the configuration stores in the array of configurable units based on the contents of the configuration file to allow all the components to execute a program (i.e., a machine). Program Load may also require the load of all PMU memories.

The ALN includes links interconnecting configurable units in the array. The links in the ALN include one or more and, in this example, three kinds of physical buses: a chunk-level vector bus (e.g., 128 bits of data), a word-level scalar bus (e.g., 32 bits of data), and a multiple bit-level control bus. In an example, interconnect 321 between switch units 311 and 312 includes a vector bus interconnect with vector bus width of 128 bits, a scalar bus interconnect with a scalar bus width of 32 bits, and a control bus interconnect.

The three kinds of physical buses differ in the granularity of data being transferred. In one example, the vector bus can carry a chunk that includes 16-Bytes (=128 bits) of data as its payload. The scalar bus can have a 32-bit payload and carry scalar operands or control information. The control bus can carry control handshakes such as tokens and other signals. The vector and scalar buses can be packet switched, including headers that indicate a destination of each packet and other information such as sequence numbers that can be used to reassemble a file when the packets are received out of order. Each packet header can contain a destination identifier that identifies the geographical coordinates of the destination switch unit (e.g., the row and column in the array), and an interface identifier that identifies the interface on the destination switch unit (e.g., North, South, East, West, etc.) used to reach the destination unit. The control network can be circuit switched based on timing circuits in the device. The configuration load/unload controller can generate a header for each chunk of configuration data of 128 bits. The header is transmitted on a header bus to each configurable unit in the array of configurable units.

In an example, a chunk of data (e.g., 128 bits) is transmitted on the vector bus that provides the chunk as vector inputs to a configurable unit. The vector bus can include payload lines (e.g., 128 payload lines, one for each bit of a 128 bit chunk), and a set of header lines. The header can include a sequence ID for each chunk. In an example, the sequence ID or other header data includes: a bit to indicate if the chunk is scratchpad memory or configuration store data; bits that form a chunk number; bits that indicate a column identifier, bits that indicate a row identifier, and bits that indicate a component identifier.

In an example of a load operation, the configuration load controller sends N chunks to a configurable unit in order from N-1 to 0 such that six 6 chunks are sent out in the most significant bit first order of Chunk 5->Chunk 4->Chunk 3->Chunk 2->Chunk 1->Chunk 0. (Note that this most significant bit first order results in Chunk 5 being distributed in round 0 of the distribution sequence from the array configuration load controller.) In an example of an unload operation, the configuration unload controller writes out the unload data in order to the memory. For both load and unload operations, the shifting in the configuration serial chains in a configuration data store in a configurable unit may be from LSB (least-significant-bit) to MSB (most-significant-bit), or MSB out first.

FIG. 3B is a high-level block diagram illustrating an example of a switch unit connecting elements in an array level network (ALN), according to some aspects. The switch units in a tile form the tile's switch fabric. The example of FIG. 3B shows a switch unit that has 8 interfaces. The north, south, east, and west interfaces of the switch units connect to other switch units or to AGCUs. The northeast, southeast, northwest, and southwest interfaces of the switch units connect to PCUs or to PMUs. Two switch units in each tile quadrant of the example are connected to an AGCU. The AGCUs in the example each have two address generators connected to one coalescing unit (CU) wherein each address generator (AG) is connected to a single one of the switch units and to the CU. As such, the CU is shown connected to multiple AGs. The CU arbitrates between the AGs and processes memory requests. Each of the eight interfaces of a switch unit can include a vector interface, a scalar interface, and a control interface to communicate with the vector network, the scalar network, and the control network. During execution of a machine after configuration, data can be sent via one or more unit switches and one or more links between the unit switches to the configurable units using the vector bus and vector interface(s) of the one or more switch units on the ALN.

In an example, the configuration load controller sends a configuration file to the configurable units via the vector interfaces of the switch units. For instance, a chunk of configuration data in a configuration file for a particular configurable unit such as PMU 341 can be sent from the configuration load/unload controller 301 to the PMU 341 via a link 320 between the configuration load/unload controller 301 and the west vector interface of the switch unit 311, then via link 331 between the southeast vector interface of switch unit 311 and the PMU 341.

Figure 4:
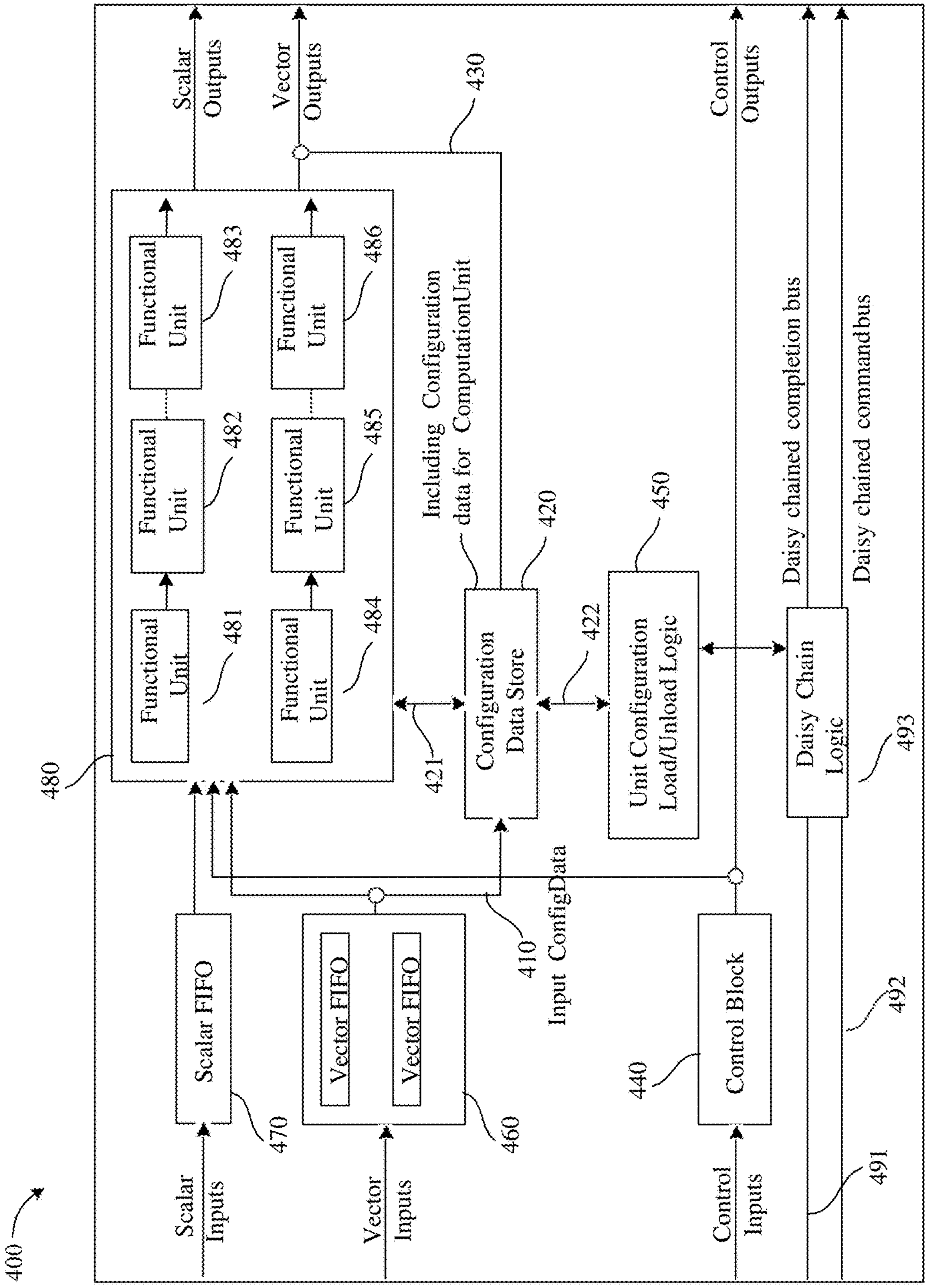
FIG. 4 is a high-level block diagram illustrating an example of a pattern compute unit (PCU), according to some aspects.

In the example shown in FIG. 3A, one of the AGCUs is includes a configuration load/unload controller 301 and is therefore a master AGCU, The master AGCU implements a register through which the host (e.g., host 120, FIG. 1) can send commands via the bus system to the master AGCU. The master AGCU controls operations on an array of configurable units in a tile and implements a program control state machine to track the state of the tile based on the commands it receives from the host through writes to the register. For every state transition, the master AGCU issues commands to all components on the tile over a daisy chained command bus (FIG. 4). The commands include a program reset command to reset configurable units in an array of configurable units in a tile, and a program load command to load a configuration file to the configurable units.

In an example, the configuration load/unload controller 301 in the master AGCU reads the configuration file from the memory and sends the configuration data to every configurable unit of the tile. The master AGCU may read the configuration file from the memory at the maximum throughput of the top-level network. The data read from memory is transmitted by the master AGCU over the vector interface on the ALN to the corresponding configurable unit.

The AGCUs may access the memory via multiple memory interfaces (e.g., via I/O interface 150 to memory 140 in FIG. 1C). Each of the memory interfaces can be accessed using several AGCUs. Each AGCU contains a reconfigurable scalar data path to generate requests for the off-chip memory. Each AGCU contains FIFOs (first-in-first-out buffers for organizing data) to buffer outgoing commands, data, and incoming responses from the off-chip memory.

The address generators AGs in the AGCUs can generate memory commands that are either dense or sparse. Dense requests can be used to bulk transfer contiguous off-chip memory regions and can be used to read or write chunks of data from/to configurable units in the array of configurable units. Dense requests can be converted to multiple off-chip memory burst requests by the coalescing unit (CU) in the AGCUs. Sparse requests can enqueue a stream of addresses into the coalescing unit. The coalescing unit uses a coalescing cache to maintain metadata on issued off-chip memory requests and combines sparse addresses that belong to the same off-chip memory request to minimize the number of issued off-chip memory requests.

FIG. 4 is a high-level block diagram illustrating an example of a pattern compute unit (PCU), according to some aspects. A PCU is an example of a configurable unit that is specialized for computational operations. In an example, a configurable unit can interface with the scalar, vector, and control buses using three corresponding sets of inputs and outputs: scalar inputs/outputs, vector inputs/outputs, and control inputs/outputs. Scalar IOs can be used to communicate single words of data (e.g., 32 bits). Vector IOs can be used to communicate chunks of data (e.g., 128 bits), in cases such as receiving configuration data in a unit configuration load process and transmitting and receiving data during operation after configuration across a long pipeline between multiple configurable units. Control IOs can be used to communicate signals on control lines such as the start or end of execution of a configurable unit. Control inputs are received by control block 440, and control outputs are provided by the control block 440.

Each vector input is buffered in this example using a vector FIFO in a vector FIFO block 460 which can include one or more vector FIFOs. Likewise in this example, each scalar input is buffered using a scalar FIFO 470. Using input FIFOs decouples timing between data producers and consumers and simplifies inter-configurable-unit control logic by making it robust to input delay mismatches.

The PCU includes multiple reconfigurable data paths in block 480. A data path in a PCU can be organized as a multi-stage (Stage 1 . . . . Stage N), reconfigurable SIMD (Single Instruction, Multiple Data) pipeline. The chunks of data pushed into the configuration serial chain in a configurable unit include configuration data for each stage of each data path in the PCU. The configuration serial chain in the configuration data store 420 is connected to the multiple data paths in block 480 via line 421.

A configurable data path organized as a multi-stage pipeline can include multiple functional units (FUs) 481, 482, 483; 484, 485, 486 at respective stages. Some of the FUs (e.g., FUs 483, 486) may be special functional units (SFUs) (e.g., FUs 483, 486) that include sigmoid circuits and other specialized computational circuits. In an example, the PCU implements a multi-stage pipeline that includes multiple FUs and that has a special function unit as the final pipeline stage. Each pipeline stage, other than the first pipeline stage, is configured to receive an input from a previous pipeline stage. Some examples have a PCU that includes many sigmoid circuits or other specialized computational circuits.

In the example, a configuration data store 420 is configured to store configuration data particular to the corresponding PCU 400. Configuration load/unload logic 450 is connected to the configuration data store 420 via line 422 and is configured to execute a unit configuration load process. The unit configuration load process includes receiving, via the bus system (e.g., the vector inputs), chunks of a configuration file particular to the configurable unit and loading the received chunks into the configuration data store 420 of the configurable unit. The chunks of the configuration file loaded into the configuration data store 420 can include configuration data such as opcodes and routing configuration for implementing a portion of an algorithm implemented by a PCU. In an example, a tile is configured to implement a matrix multiply and numerous PCUs within the tile implement a portion of the matrix multiply.

In an example, the configuration data store 420 includes serial chains of latches. The latches store bits that control the configuration of the resources in the configurable unit. A serial chain in a configuration data store can include a shift register chain for configuration data and a second shift register chain for state information and counter values connected in series. Input configuration data 410 can be provided to a vector FIFO as vector inputs and then transferred to the configuration data store 420. Output configuration data 430 can be unloaded from the configuration data store 420 using the vector outputs.

In an example, the CGRA uses a daisy-chained completion bus to indicate when a load/unload command has been completed. The master AGCU transmits the program load and unload commands to configurable units in the array of configurable units over a daisy-chained command bus. As shown in the example of FIG. 4, a daisy-chained completion bus 491 and a daisy-chained command bus 492 are connected to daisy-chain logic 493, which communicates with the configuration load/unload logic 450. The daisy-chain logic 493 can include load complete status logic, as described below. The daisy-chained completion bus is further described below. Other topologies for the command and completion buses are clearly possible but not described here.

FIG. 5 is a high-level block diagram illustrating an example of a pattern memory unit (PMU), according to some aspects. The PMU includes instrumentation circuitry 518. The PMU includes scratchpad memory 530 coupled with a reconfigurable scalar data path 520 intended for address calculation (e.g., read address (RA), write address (WA)) and control (e.g., read enable (RE), write enable (WE)) of the scratchpad memory 530. PMUs can be used to distribute on-chip memory throughout the array of reconfigurable units. In an example, address calculation within the memory in the PMUs is performed on the PMU data path, while the core computation is performed within a PCU.

The bus interfaces can include scalar inputs, vector inputs, scalar outputs, and vector outputs, usable to provide write data (WD). The data path can be organized as a multi-stage reconfigurable pipeline, including stages of functional units (FUs) and associated pipeline registers (PRs) that register inputs and outputs of the functional units. PMUs can be used to store distributed on-chip memory throughout the array of reconfigurable units.

The PMU includes a scratchpad memory 530 that may have multiple SRAM banks 531, 532, 533, 534. Banking and buffering logic 535 for the SRAM banks in the scratchpad memory 530 can be configured to operate in several banking modes to support various access patterns. In an example, a computation includes using a lookup table stored in the scratchpad memory 530. The lookup table may be loaded into the scratchpad memory from a configuration file or from some other source. In an example, a value, I, received via the scalar data path 520 is used for indexing into the lookup table. Here, the lookup table implements a function, f(I). Each PMU can include write address calculation logic and read address calculation logic that provide write address WA, write enable WE, read address RA and read enable RE to the banking buffering logic 535. Based on the state of the local FIFOs 511 and 519 and external control inputs, the control block 515 can be configured to trigger the write address computation, read address computation, or both, by enabling the appropriate counters 516. The counters 516 are shown as a programmable counter chain 516 (Control Inputs, Control Outputs) and control block 515 can trigger PMU execution.

Instrumentation logic 518 is included in this example of a configurable unit. The instrumentation logic 518 can be part of the control block 515 or implemented as a separate block on the device. The instrumentation logic 518 is coupled to the control inputs and to the control outputs. Also, the instrumentation logic 518 is coupled to the control block 515 and the counter chain 516, for exchanging status signals and control signals in support of a control barrier network configured as discussed above.

Figure 6A:
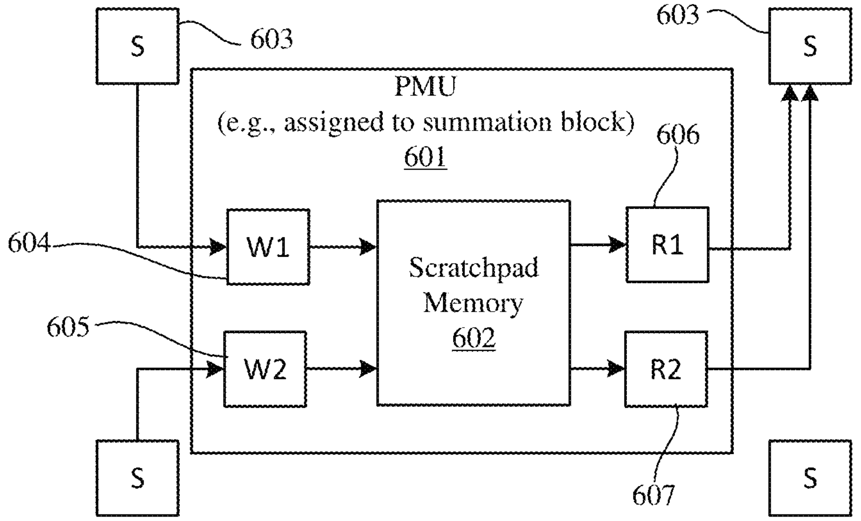
FIG. 6A is a high level block diagram illustrating an example of a data flow in a patten memory unit (PMU), according to some aspects.

FIG. 6A is a high level block diagram illustrating an example of a data flow in a PMU 601, according to some aspects. The PMU 601 includes a scratchpad memory 602 and is configured to implement a first input context 604, a second input context 605, a first output context 606, and a second output context 607. The input contexts 604, 605 receive input data from switch units 603, use the input data to produce scratchpad data, and store the scratchpad data in the scratchpad memory 602. The output contexts 606, 607 read scratchpad data from the scratchpad memory 602, use the scratchpad data to produce output data, and send the output data to the switch units 603.

In an example, the first input context 604 receives a first vector as a series of values and writes that vector directly to the scratchpad memory 602. Here the first input context 604 uses input data to produce scratchpad data that equals the input data. In an example, the second input context 605 receives a second vector as a series of values and writes that vector directly to the scratchpad memory 602. Here the second input context 605 also uses input data to produce scratchpad data that equals the input data. In many examples, the PMU's capabilities are limited to calculating scratchpad addresses to which input data is written. In other examples, the PMU may have additional capabilities. In such an example, the second input context 605 receives a second vector as a second series of values, applies a function that produces a third vector that is the outer product of the first vector to the second vector, and stores the result of the function to the scratchpad memory 602. Here, the second input context uses input data to produce scratchpad data by applying a function to the second series of values. The first output context 606 reads the third vector from the scratchpad memory and sends the third vector to the switch units 603. Here, the first output context 606 uses the scratchpad data to produce output data that equals the scratchpad data. The second output context 607 reads the third vector from the scratchpad memory, computes the dot product of the first vector and the second vector by adding the elements of the third vector together, and sends the dot product of the first vector and the second vector to the switch units 603. The second output context reads the third vector from memory, produces a fourth vector by dividing each element of the third vector by the previously computed dot product and then applying a sigmoid function, and sends the fourth vector to the switch units 603. In this example, the operations of some of the input contexts and output contexts depend on the results of other input contexts and output contexts.

Figure 6B:
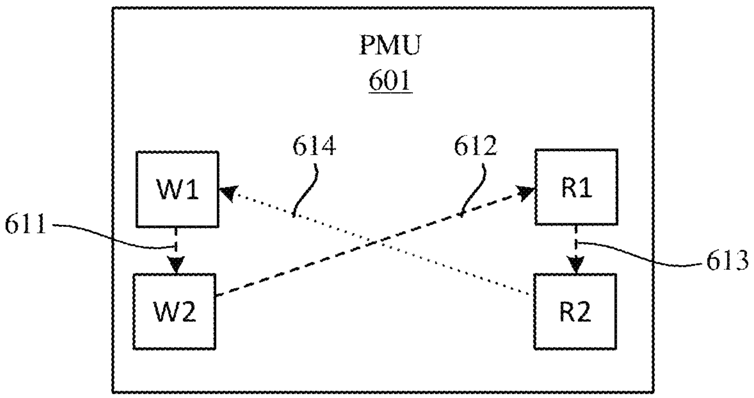
FIG. 6B is a high level block diagram illustrating an example of a control flow in a PMU, according to some aspects.

FIG. 6B is a high level block diagram illustrating an example of a control flow in a PMU 601, according to some aspects. Returning to the example, the second input context requires that the first vector is stored in the scratchpad memory 602 before the third vector can be produced. As such, the first input context 604 produces a first trigger 611 in response to storing the first vector in the scratchpad memory 602 and the second input context produces the third vector in response to receiving the first trigger 611. The first output context 606 requires that the third vector is stored in the scratchpad memory 602 before the dot product can be calculated. As such, the second input context 605 produces a second trigger 612 in response to storing the third vector in the scratchpad memory 602 and the first output context 606 produces the dot product in response to receiving the second trigger 612. The second output context 607 requires that the dot product be calculated before the fourth vector can be calculated. As such, the first output context 606 produces a third trigger 613 in response to calculating the dot product and the second output context 607 produces the fourth vector in response to receiving the third trigger 613. The second output context produces a fourth trigger 614 in response to sending the fourth vector to the switch unit 603. The first input context may proceed with another operation (e.g., copying another input vector to scratchpad memory) in response to receiving the fourth trigger 614. Note that this example is provided to show certain aspects and is not well optimized for parallel operation. The triggers may be sent at other times to optimize parallel operations within the PMU. Furthermore, the functions applied to the data (e.g., sigmoid) may require that the PMU send data to a PCU and receive results from the PCU.

Figure 7A:
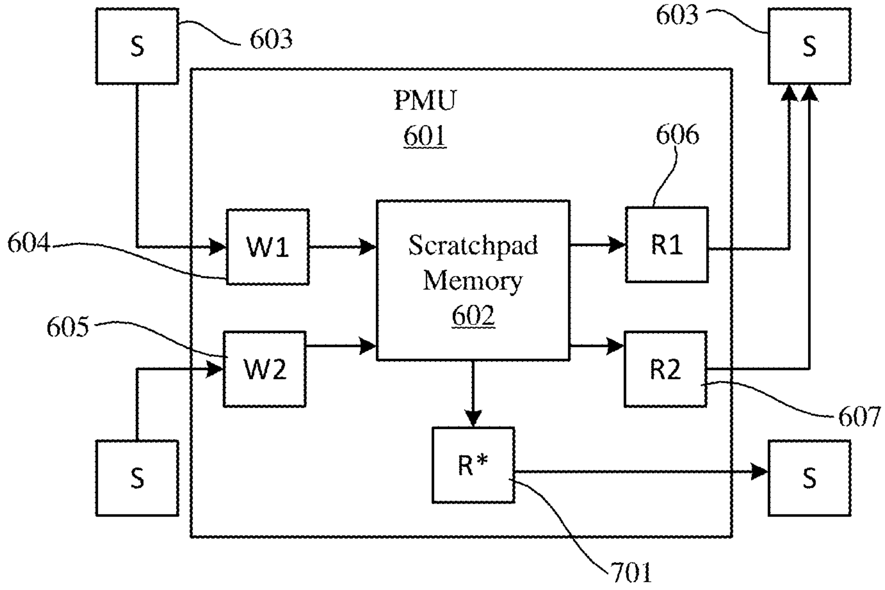
FIG. 7A is a high level block diagram illustrating an example of a data flow in a PMU with a bypassable watchpoint context that is not bypassed, according to some aspects.

FIG. 7A is a high level block diagram illustrating an example of a data flow in a PMU with a bypassable watchpoint context 701 that is not bypassed, according to some aspects. In the example discussed above, the first vector and the third vector are intermediate data that never leaves the PMU. As such, the outputs of the first input context 604 and the second input context 605 are not observable for debugging. A bypassable watchpoint context 701 is therefore implemented in the PMU. When not bypassed, the bypassable watchpoint context reads scratchpad data from the scratchpad memory and sends the scratchpad data to the switch units 603 without alteration. As such, the data that the bypassable watchpoint sends to the switch units 603 may include all or part of the first vector, all or part of the second vector, all or part of the both the first vector and the second vector, or any other data stored in the scratchpad memory.

Bypassable watchpoints are specified before an application or algorithm is compiled to produce configuration data. As such, the configuration data includes the bypassable watchpoints and the bypassable watchpoints are implemented in the PMUs regardless of whether the bypassable watchpoints are bypassed or not bypassed. In this manner, the developer is assured that the mapping of memory and computational operations to the configurable units does not change when debugging is active or inactive. Debugging is considered active when one or more of the bypassable watchpoints is not bypassed. An application may go into production when debugging is inactive because all of the watchpoints are bypassed and do not consume additional cycles to produce debugging data.

Figure 7B:
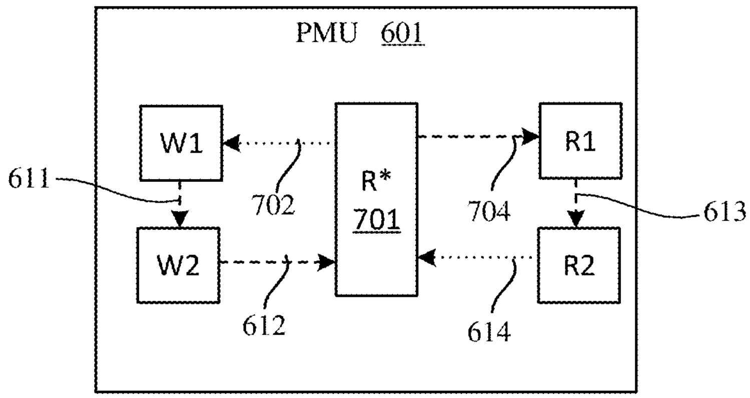
FIG. 7B is a high level block diagram illustrating an example of a control flow in a PMU with a bypassable watchpoint context that is not bypassed, according to some aspects.

FIG. 7B is a high level block diagram illustrating an example of a control flow in a PMU with a bypassable watchpoint context 701 that is not bypassed, according to some aspects. Scratchpad data that a bypassable watchpoint sends to the switch units 603 must exist before it can be sent. As such, the scratchpad memory intercepts triggers such that the scratchpad data can be sent to the switch fabric during the time that the desired debugging data exists. Here, "intercept" means that the bypassable watchpoint receives a trigger that would otherwise go to an input context or output context in the absence of the bypassable watchpoint. For example, FIG. 6B shows the second trigger 612 going from the second input context 605 to the first output context 606 and shows the fourth trigger 614 going from the second output context 607 to the first input context 604. FIG. 7B shows the bypassable watchpoint context 701 intercepting the second trigger 612 and the fourth trigger 614. In the example, the bypassable watchpoint may send the third vector to the switch fabric in response to receiving the second trigger 612 and may send a fifth trigger 704 to the first output context 606 once the third vector is sent. The first output context 606 produces the dot product in response to receiving the fifth trigger 704. Similarly, the bypassable watchpoint may send the other intermediate data to the switch fabric in response to receiving the fourth trigger 614 and may send a sixth trigger 702 to the first output context 606 once that intermediate data is sent. The first input context may proceed with another operation (e.g., copying another input vector to scratchpad memory) in response to receiving the sixth trigger 702.

Figure 8A:
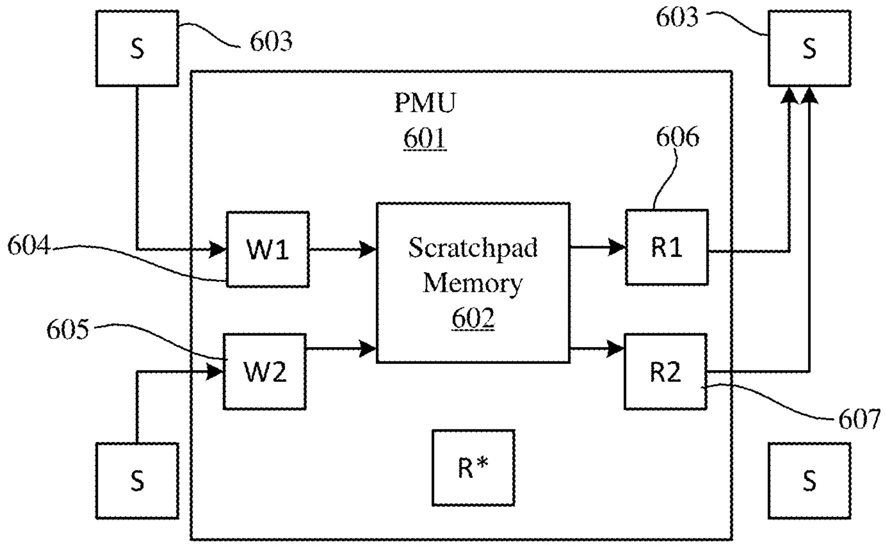
FIG. 8A is a high level block diagram illustrating an example of a data flow in a PMU with a bypassable watchpoint context that is bypassed, according to some aspects.

FIG. 8A is a high level block diagram illustrating an example of a data flow in a PMU with a bypassable watchpoint context that is bypassed, according to some aspects. As can be seen, a bypassable watchpoint context that is bypassed sends no data to the switch fabric.

Figure 8B:
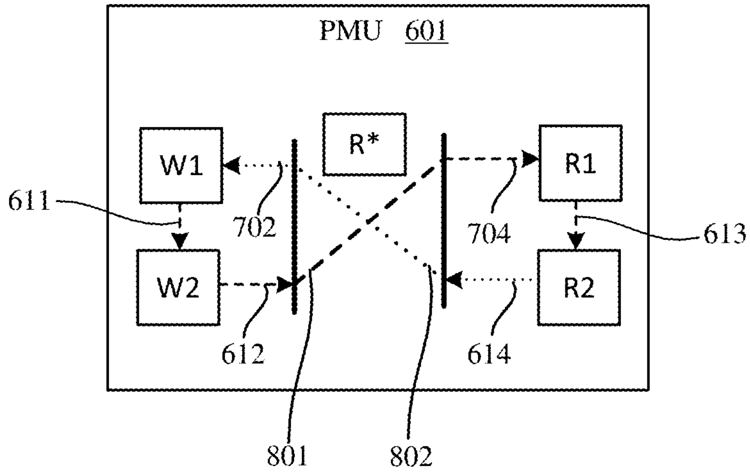
FIG. 8B is a high level block diagram illustrating an example of a control flow in a PMU with a bypassable watchpoint context that is bypassed, according to some aspects.

FIG. 8B is a high level block diagram illustrating an example of a control flow in a PMU with a bypassable watchpoint context that is bypassed, according to some aspects. A bypassable watchpoint intercepts triggers whether bypassed or not. When bypassed, the bypassable watchpoint sends no data to the switch fabric. In the example, the bypassable watchpoint sends the fifth trigger 704 to the first output context in response to receiving the second trigger 612 and sends the sixth trigger 702 to the first input context in response to receiving the fourth trigger 614. Dashed line 801 represents bypassing the bypassable watchpoint context 701 by intercepting the second trigger 612 and sending the fifth trigger 704 to the first output context 606 without running the bypassable watchpoint context 701. Dashed line 802 represents bypassing the bypassable watchpoint context 701 by intercepting the fourth trigger 614 and sending the sixth trigger 702 to the first input context 604 without running the bypassable watchpoint context 701.

FIG. 9A is a diagram illustrating an example of pseudocode implementing an input context, according to some aspects. An input context reads input data that is received from the switch fabric, uses the input data to produce scratchpad data, and writes the scratchpad data to the scratchpad memory. In some examples, the PMU produces scratchpad data by reading the input data from an input port or buffer. In other examples the PMU produces scratchpad data by operating on input data that has been read from an input port or buffer. The pseudo code has two iterators. The first iterator is a for loop that iterates on the variable "i". The second iterator is a for loop that iterates on the variable "j". The function f(i,j) calculates an address in the scratchpad memory. The function "inputData( )" returns input data that has been received from the switch fabric. In an example, "inputData( )" takes arguments such as a port indicator that specifies an input port of the PMU. In many examples, the PMU cannot operate directly on the data returned by "inputData( )". In such examples, the PMU simply calculates the address (address=f(i,j)) at which to write the data returned by "inputData( )". In such an example, the function g( ) is not implemented and the line of code is: scrachpadData[f(i, j)]=inputData( ) In other examples, the function g( ) is implemented in the PCU. As such, the PMU may pass the input data value to the PCU via the switch fabric and may receive the function result from the PCU via the switch fabric. The function "f(i,j)" calculates an address in the scratchpad memory at which the result returned by "g(inputData( )" is stored. In an example, the PMU performs all address calculations and thereby calculates f(i,j). The circuitry inside a PMU may implement the algorithm shown in FIG. 9A to thereby implement an input context.

FIG. 9B is a diagram illustrating an example of pseudocode implementing an output context, according to some aspects. An output context reads scratchpad data from the scratchpad memory, uses the scratchpad to produce output data, and sends the output data to the switch fabric. The pseudo code has two iterators. The first iterator is a for loop that iterates on the variable "i". The second iterator is a for loop that iterates on the variable "j". The function "f(i,j)" calculates an address in the scratchpad memory from which the scratchpad data is read. The function "g(-operand-)" represents any function that operates on one or more operand. The function "outputData( )" sends data to the switch fabric. In an example, "outputData( )" takes arguments such as a port indicator that specifies an output port of the PMU, seqID that is a value of a sequence identifier, "destinationAddr" that specifies a node in the ALN to which the output data is sent, etc. The function "sendTrigger(targetAddr)" sends a trigger (e.g., first trigger 611, etc.) to a node on the ALN specified by "targetAddr". The value of "targetAddr" may be the address of the node on the ALN to which the trigger is sent. The circuitry inside a PMU can implement the algorithm shown in FIG. 9B to thereby implement an output context.

Figure 10:
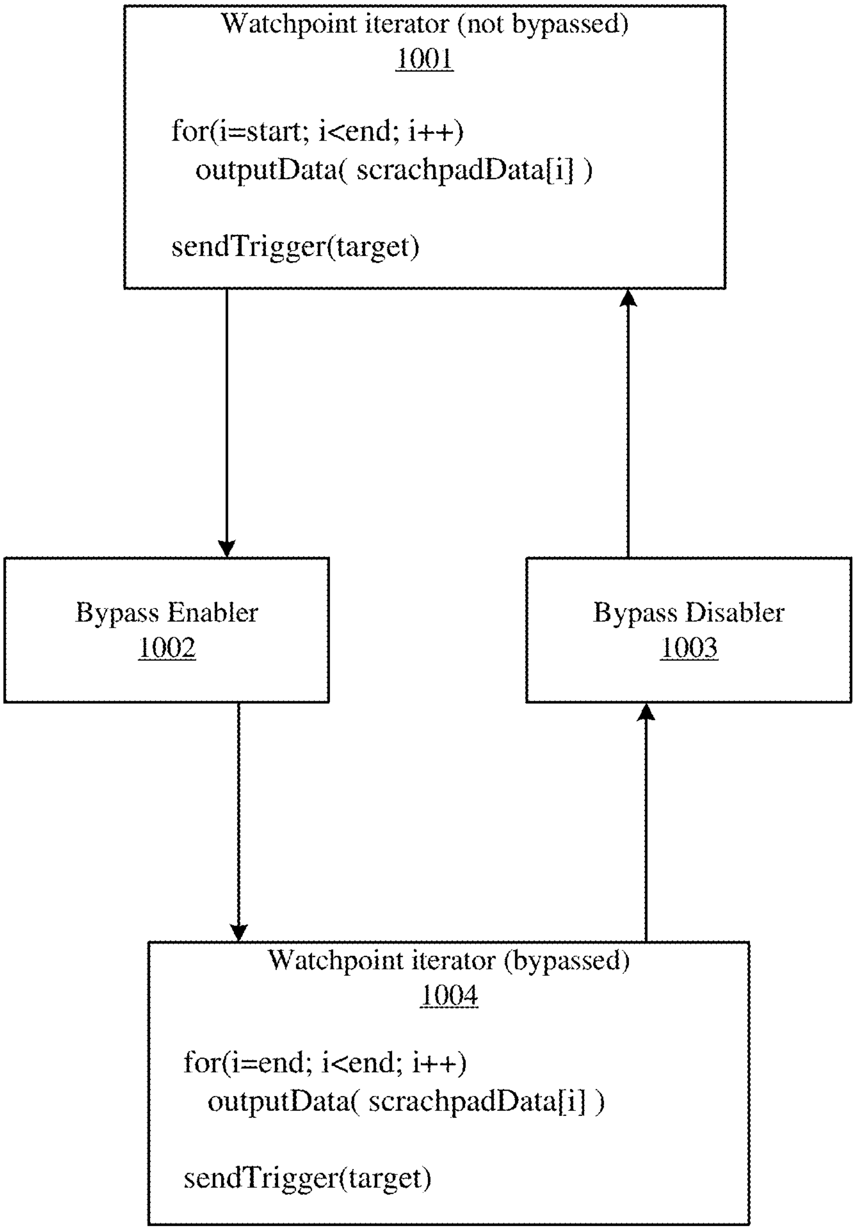
FIG. 10 is a diagram illustrating an example of pseudocode implementing a bypassable watchpoint context, according to some aspects.

FIG. 10 is a diagram illustrating an example of pseudocode implementing a bypassable watchpoint context, according to some aspects. The example shows the bypassable watchpoint context in a non-bypassed form 1001 and in a bypassed form 1004. In the example, the bypassable watchpoint context reads scratchpad data from the scratchpad memory and sends the output data to the switch fabric. The pseudo code has one iterator. The one iterator is a for loop that iterates on the variable "i". The function "outputData( )" sends data to the switch fabric. In an example, "outputData( )" takes arguments such as a port indicator that specifies an output port of the PMU, seqID that is a value of a sequence identifier, "destinationAddr" that specifies a node in the ALN to which the output data is sent, etc. Here, the iterator simply loops through scratchpad memory locations and sends the scratchpad data at those locations to the switch fabric. The function "sendTrigger(targetAddr)" sends a trigger (e.g., first trigger 611, etc.) to a node on the ALN specified by "targetAddr". The value of "targetAddr" may be the address of the node on the ALN to which the trigger is sent.

The example illustrated in FIG. 10 bypasses the iterator by setting the initial value of "i" to a value (e.g., "end") such that the loop is never entered. Those practiced in the art know of numerous other techniques for bypassing the watchpoint. In another example, each watchpoint context has an activation flag indicating that the watchpoint context should be activated. For example, the iterator is run and the triggers are sent when the activation is set. However, the iterator is not run and the triggers are sent when the activation flag is not set. The activation flag may be a bit or a token in a register that may be set by the bypass enabler and cleared by the bypass disabler.

Observing the pseudocode in the non-bypassed form 1001 of watchpoint context, the iterator of the bypassable watchpoint context begins at "start" when the bypassable watchpoint context is not bypassed. As such, the iterator sends scratchpad data beginning at the "start" location in the scratchpad memory and ending at the location immediately preceding "end" in the scratchpad memory. In contrast the iterator in pseudocode of the bypassed form 1004 of watchpoint context begins at "end". As such, the iterator does not send any scratchpad data to the switch fabric.

In an example, a configuration file is used to configure the PMU as shown in FIG. 7A and FIG. 7B. The bypassable watchpoint context 701 is in the non-bypassed form 1001 and the PMU produces debugging data because the bypassable watchpoint context is not bypassed. A bypass enabler 1002 processes the configuration file to place the bypassable watchpoint context 701 in the bypassed form 1004 (e.g., sets the bypassable watchpoint context's iterator to begin at "end"). The configuration file is now used to configure the PMU as shown in FIG. 8A and FIG. 8B. The PMU no longer produces the debugging data because the bypassable watchpoint context is bypassed. In the example, bypassing the bypassable watchpoint context includes intercepting the second trigger 612 and sending the fifth trigger 704 to the first output context 606 without running the bypassable watchpoint context. Running the bypassable watchpoint context includes receiving a trigger (e.g., second trigger 612), sending scratchpad data to the switch fabric, and sending a trigger (e.g., fifth trigger 704). Bypassing the bypassable watchpoint context includes receiving a trigger (e.g., second trigger 612) and sending a trigger (e.g., fifth trigger 704), but does not include sending scratchpad data to the switch fabric.

A bypass disabler 1003 processes the configuration file to place the bypassable watchpoint context 701 in the non-bypassed form 1001 (e.g., sets the bypassable watchpoint context's iterator to begin at "start")

Figure 11:
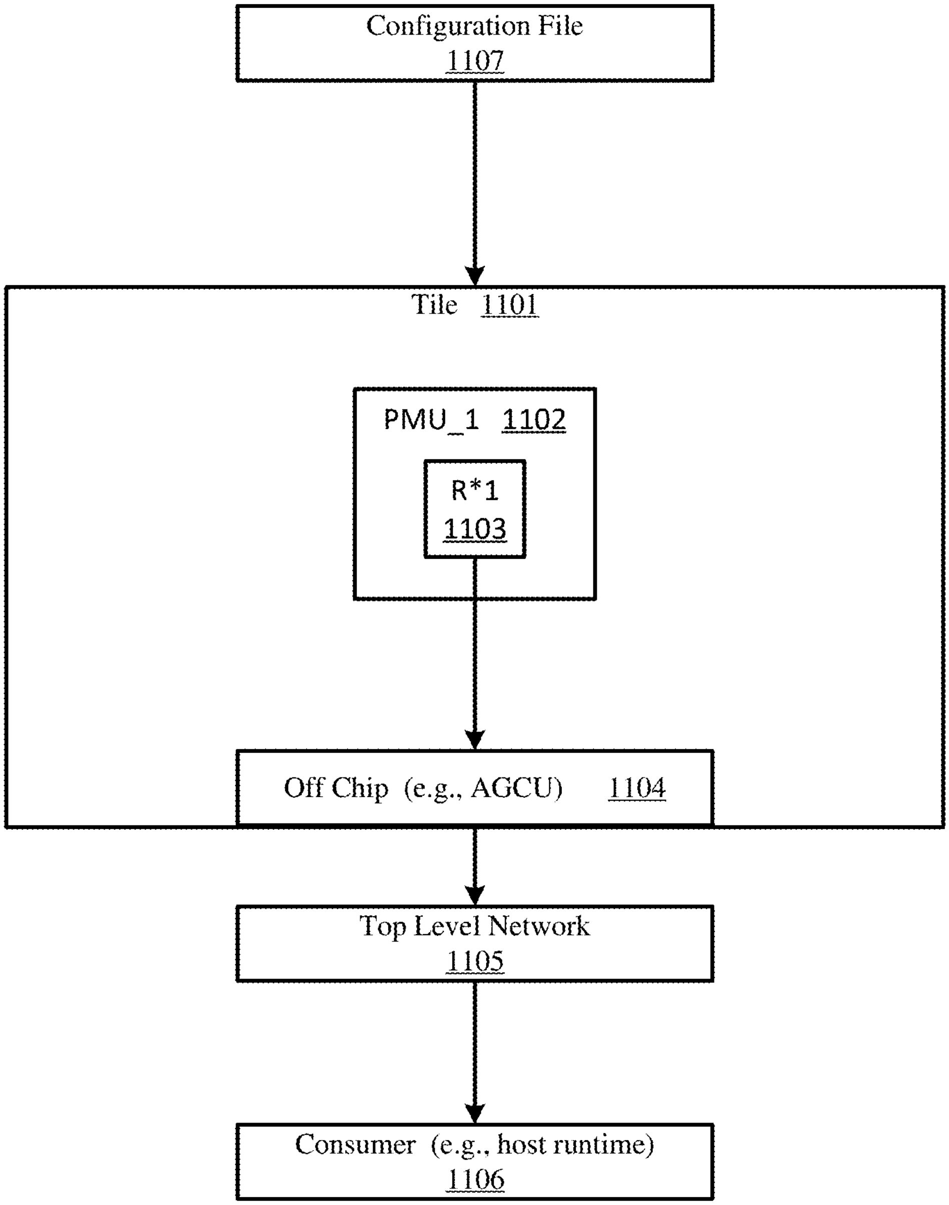
FIG. 11 is a high level block diagram illustrating an example of a PMU sending scratchpad data to an off chip consumer, according to some aspects.

FIG. 11 is a high level block diagram illustrating an example of a PMU sending scratchpad data to an off chip consumer, according to some aspects. A configuration file 1107 is used to configure a tile 1101 that includes a first PMU 1102. In accordance with the configuration file 1107, the first PMU 1102 implements a first bypassable watchpoint context 1103 that sends scratchpad data via the switch fabric to a communications port (e.g., an AGCU, off chip interface, etc.). In this example, the communications port can pass data between the switch fabric and the TLN. As such, the off chip interface 1104 sends the scratchpad data to a consumer 1106 via the top-level network 1105. The consumer may be the host runtime process or some other process or entity.

Figure 12:
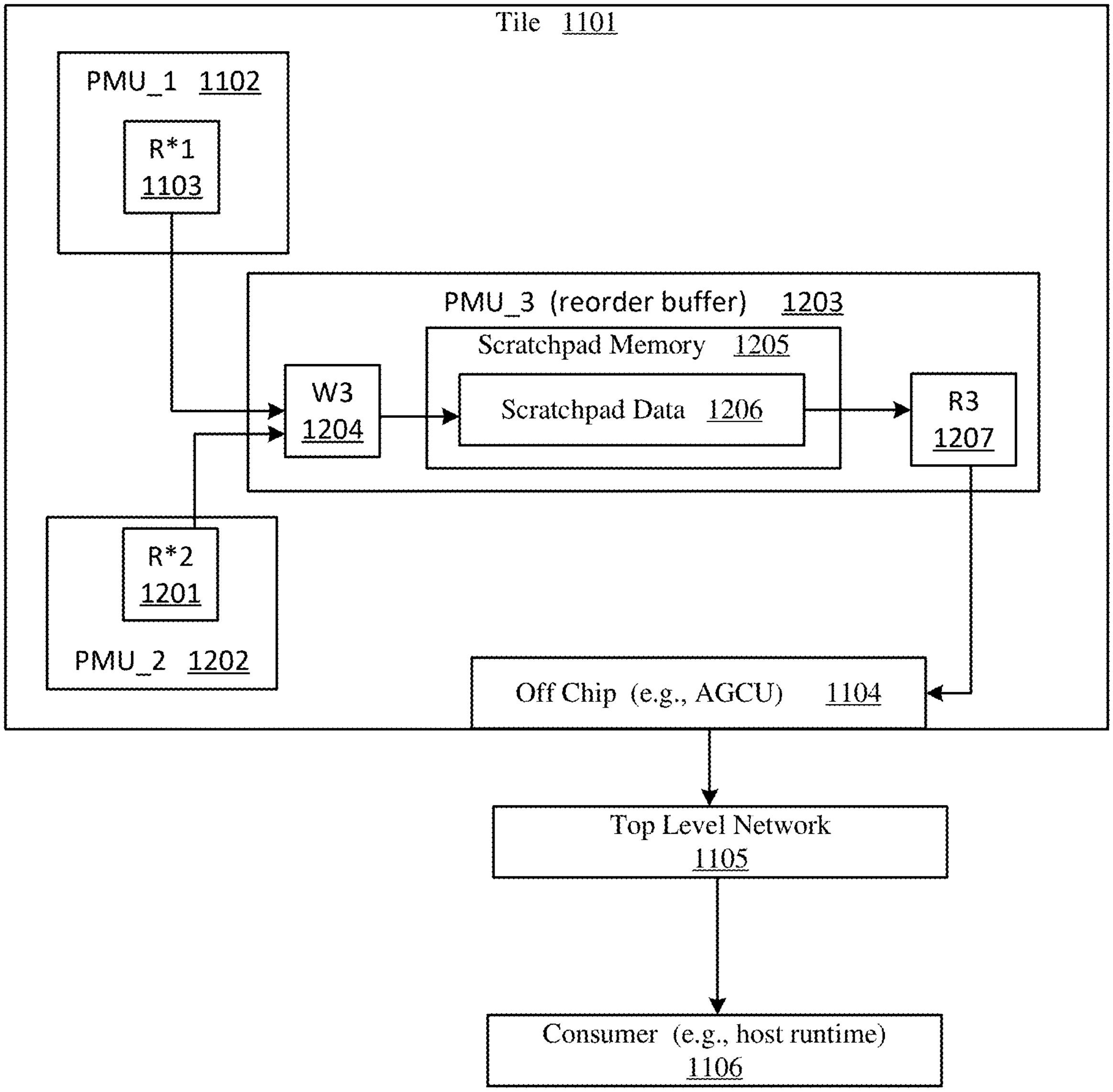
FIG. 12 is a high level block diagram illustrating an example of a reorder buffer receiving scratchpad data from multiple watchpoint contexts and sending reordered scratchpad data to an off chip consumer, according to some aspects.

FIG. 12 is a high level block diagram illustrating an example of a reorder buffer receiving scratchpad data from multiple watchpoint contexts and sending reordered scratchpad data to an off chip consumer, according to some aspects. In accordance with another configuration file, the first PMU 1102 implements a first bypassable watchpoint context 1103, a second PMU 1202 implements a second bypassable watchpoint context 1201, and a third PMU 1203 is configured to implement a reorder buffer (ROB). The reorder buffer has an input context 1204 that receives data from the first bypassable watchpoint context 1103 and the second bypassable watchpoint context 1201. The reorder buffer's input context 1204 stores the data received from the bypassable watchpoint contexts 1103, 1201 as scratchpad data 1206 in the scratchpad memory 1205 of the third PMU 1203. In an example, the data from each bypassable watchpoint context may be received in packets that include sequence identifiers that are used for reordering the data. The sequence identifiers corresponding to data received from the first bypassable watchpoint context 1103 may be used to select locations in the scratchpad memory at which to store the data received from the first bypassable watchpoint context. The sequence identifiers corresponding to data received from the second bypassable watchpoint context 1201 may be used to select locations in the scratchpad memory at which to store the data received from the second bypassable watchpoint context 1201. As such, the scratchpad memory of the third PMU 1203 holds reordered data. The output context 1207 of the reorder buffer sends the reordered scratchpad data via the switch fabric to an off chip interface 1104 (e.g., an AGCU).

The off chip interface 1104 can be a communications port that sends the scratchpad data to a consumer 1106 via the top-level network 1105. The consumer may be the host runtime process or some other process or entity.

Figure 13:
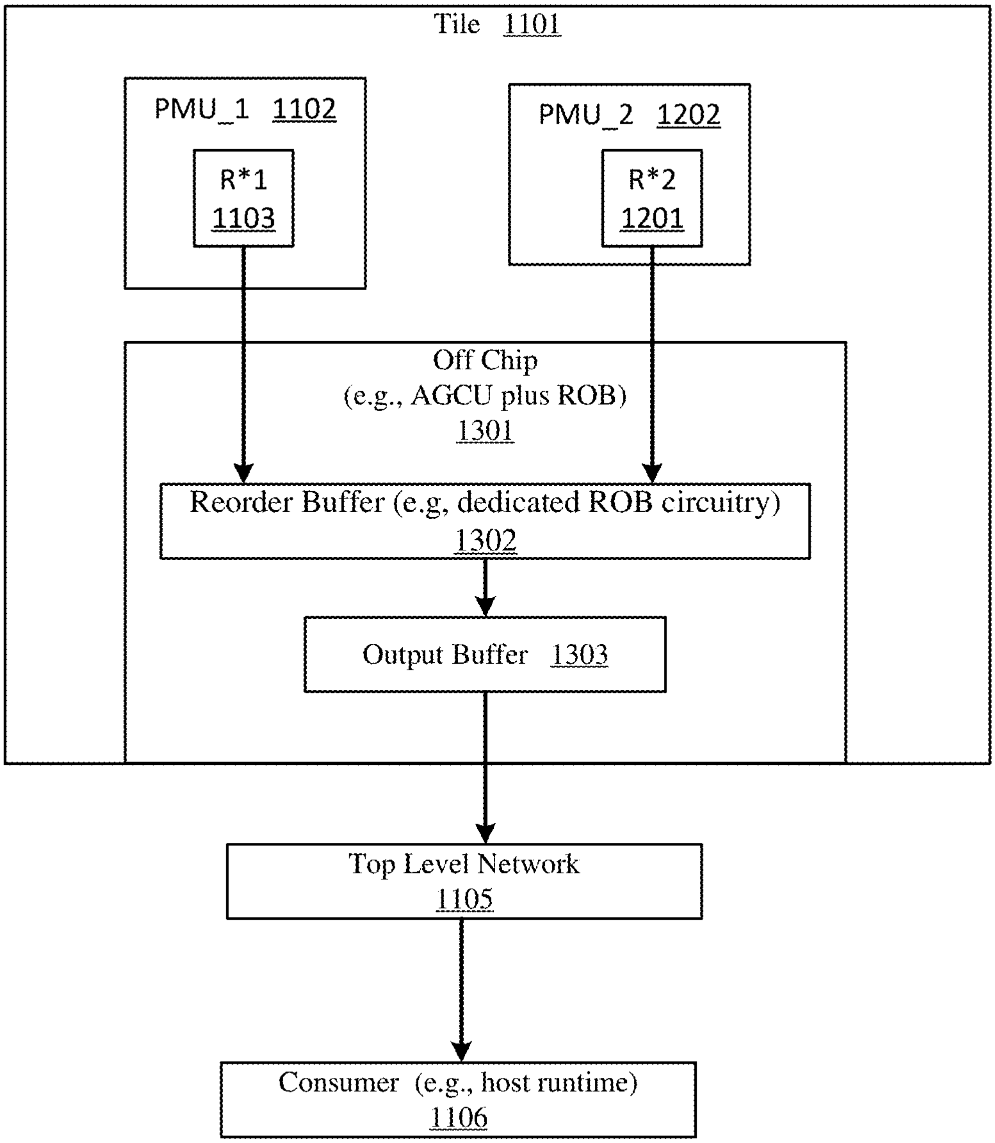
FIG. 13 is a high level block diagram illustrating an example of an off chip interface receiving scratchpad data from multiple watchpoint contexts and sending reordered scratchpad data to an off chip consumer, according to some aspects.

FIG. 13 is a high level block diagram illustrating an example of an off chip interface 1301 receiving scratchpad data from multiple watchpoint contexts and sending reordered scratchpad data to an off chip consumer, according to some aspects. The off chip interface 1301 can be a communications port that sends data to an off chip consumer. The off chip interface may include an AGCU, a reorder buffer 1302 (ROB), and an output buffer 1303. Here, the ROB 1302 can include dedicated ROB circuitry designed specifically for performing ROB operations. In accordance with yet another configuration file, the first PMU 1102 implements a first bypassable watchpoint context 1103 and the second PMU 1202 implements the second bypassable watchpoint context 1201. Here, the first bypassable watchpoint context 1103 and the second bypassable watchpoint context 1201 are configured to send data directly to the ROB 1302 in the off chip interface 1301. The ROB 1302 receives the data from the bypassable watchpoint contexts 1103, 1201, reorders it, and writes the reordered data to the output buffer. The off chip interface 1301 sends the reordered data in the output buffer 1303 to a consumer 1106 via the top-level network 1105. The consumer may be the host runtime process or some other process or entity.

Figure 14:
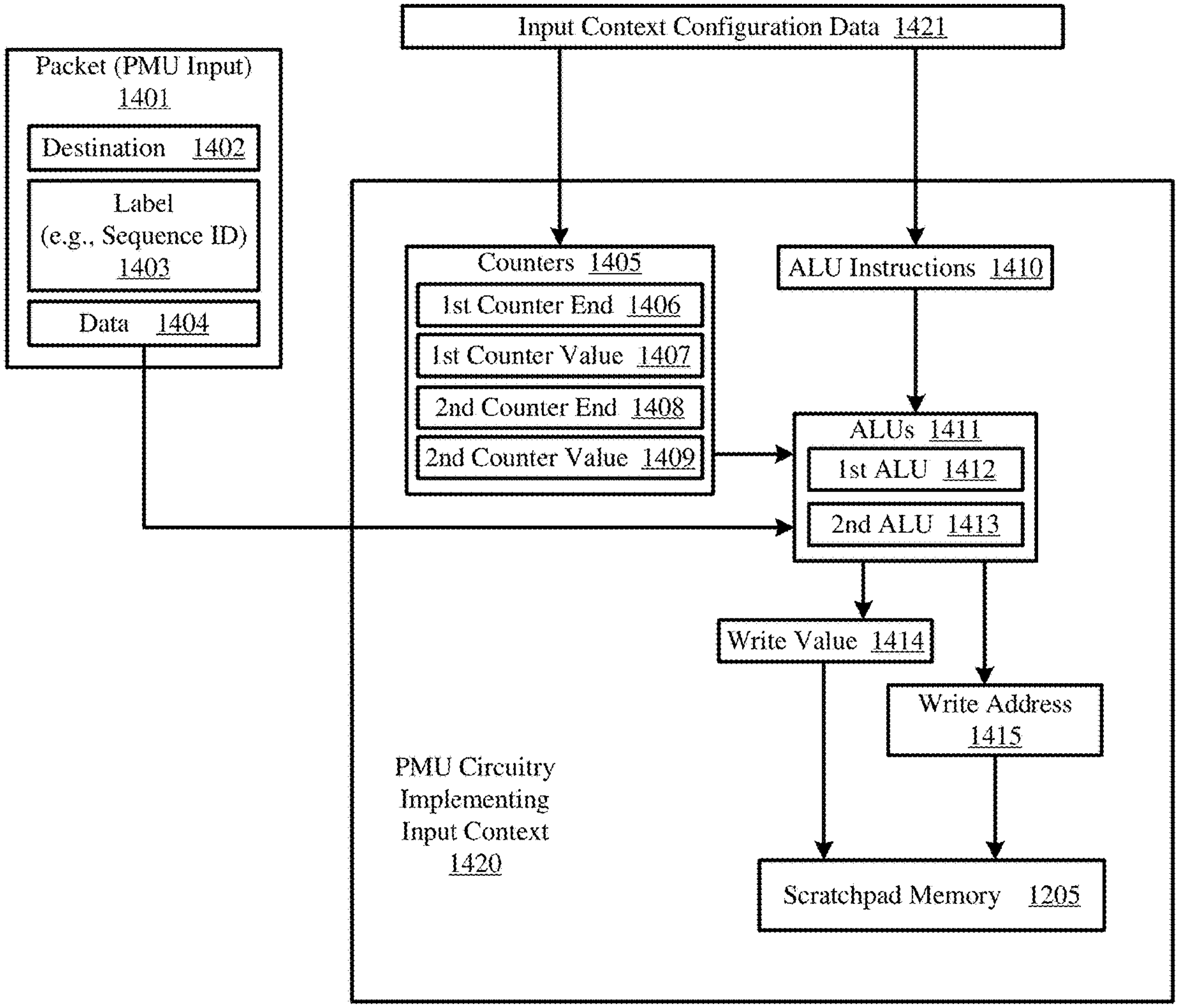
FIG. 14 is a high level block diagram illustrating an example of PMU circuitry configured to implement an input context, according to some aspects.

FIG. 14 is a high level block diagram illustrating an example of PMU circuitry configured to implement an input context 1420, according to some aspects. The PMU includes counters 1405, arithmetic logic units 1411 (e.g., ALU 1412, 1413), and a scratchpad memory 1205. A configuration file can include input context configuration data 1421 that configures the counters 1405 and the ALUs 1411 to implement the iterators and functions of an input context (see, e.g., FIG. 9A). The counters 1405 can include a first counter that has a first counter end 1406 and a first counter value 1407. The counters 1405 can include additional counters such as a second counter that has a second counter end 1408 and a second counter value 1409. An iterator may be configured by setting a counter's counter value (e.g., first counter value 1407) to the iterator's start value of the iterator and setting the counter's counter end (e.g., first counter end 1406) to the iterator's end value. ALU instructions 1410 may be set from the input context configuration data 1421 to thereby configure the ALUs to perform specific operations. The switch fabric may pass a packet 1401 to the PMU 1420. The packet 1401 can include a destination address 1402, a label 1403, and payload data 1404. The destination can indicate a reconfigurable unit that is to receive the packet. The label can include metadata corresponding to the payload data (e.g., a sequence ID). The payload data may include scalar can vector values that are operands in an algorithm implemented by the tile. The ALUs may use counter data (e.g., counter values and counter ends), packet payload data 1404, and packet metadata (e.g., label 1403) to produce computed values. For example, the counter values may be used to calculate a write address 1415 and the payload data 1404 may be used to calculate a write value 1414 that is to be stored at the write address.

Figure 15:
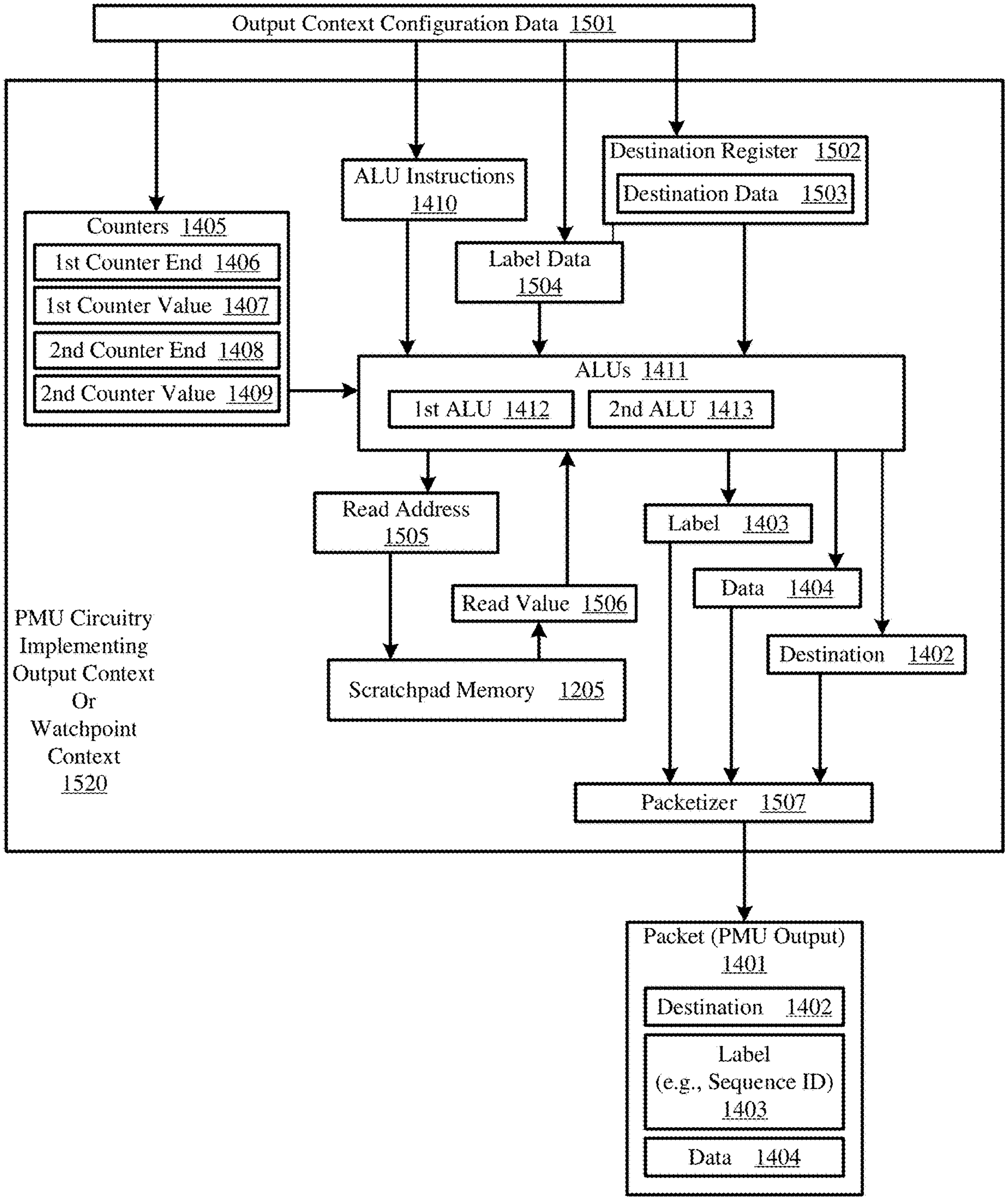
FIG. 15 is a high level block diagram illustrating an example of PMU circuitry configured to implement an output context, according to some aspects.

FIG. 15 is a high level block diagram illustrating an example of PMU circuitry configured to implement an output context 1520, according to some aspects. A watchpoint context may be implemented as a simplified version of the output context illustrated in FIG. 15. An output context sends a packet 1401 to the switch fabric. The switch fabric delivers the packet 1401 to the destination node indicated by the destination address 1402 in the packet 1401. The PMU includes counters 1405, arithmetic logic units 1411 (e.g., ALU 1412, 1413), a scratchpad memory 1205, and registers. A destination register 1502 stores destination data 1503 such as a destination address or data for determining the destination address 1402 of the packet 1401. Another register can store label data of determining the label 1403 of the packet 1401. A configuration file can include output context configuration data 1501 that configures the counters 1405 and the ALUs 1411 to implement the iterators and functions of an output context (see, e.g., FIG. 9B). The output context configuration data 1501 may also include values that are stored as the destination data 1503 and label data 1504. In an example, the output context configuration data 1501 includes a destination address that is stored as the destination data 1503 and that is copied into the destination address 1402 of the packet 1401. In an example, the output context configuration data 1501 includes a sequence identifier that is stored as the label data 1504 and that is copied into the label 1403 of the packet 1401. The counters 1405 can include a first counter that has a first counter end 1406 and a first counter value 1407. The counters 1405 can include additional counters such as a second counter that has a second counter end 1408 and a second counter value 1409. An iterator may be configured by setting a counter value (e.g., first counter value 1407) to the iterator's start value of the iterator and setting the counter's counter end (e.g., first counter end 1406) to the iterator's end value. ALU instructions 1410 may be set from the output context configuration data 1501 to thereby configure the ALUs to perform specific operations. In an example, the ALUs can calculate a read address from data such as the counter data (e.g., counter values and counter ends), data stored in PMU registers, etc. The read address 1505 may be used to read a read value 1506 from the scratchpad memory. The ALU may use the read value 1506, counter data, and other stored in PMU registers to determine the label 1403, data 1404, and destination address of the packet 1401. The packet may then be sent to the switch fabric. In an example, the PMU includes an output port 1507 that produces a packet 1401 in response to receiving the label 1403, data 1404, and destination address of the packet 1401.

Figure 16:
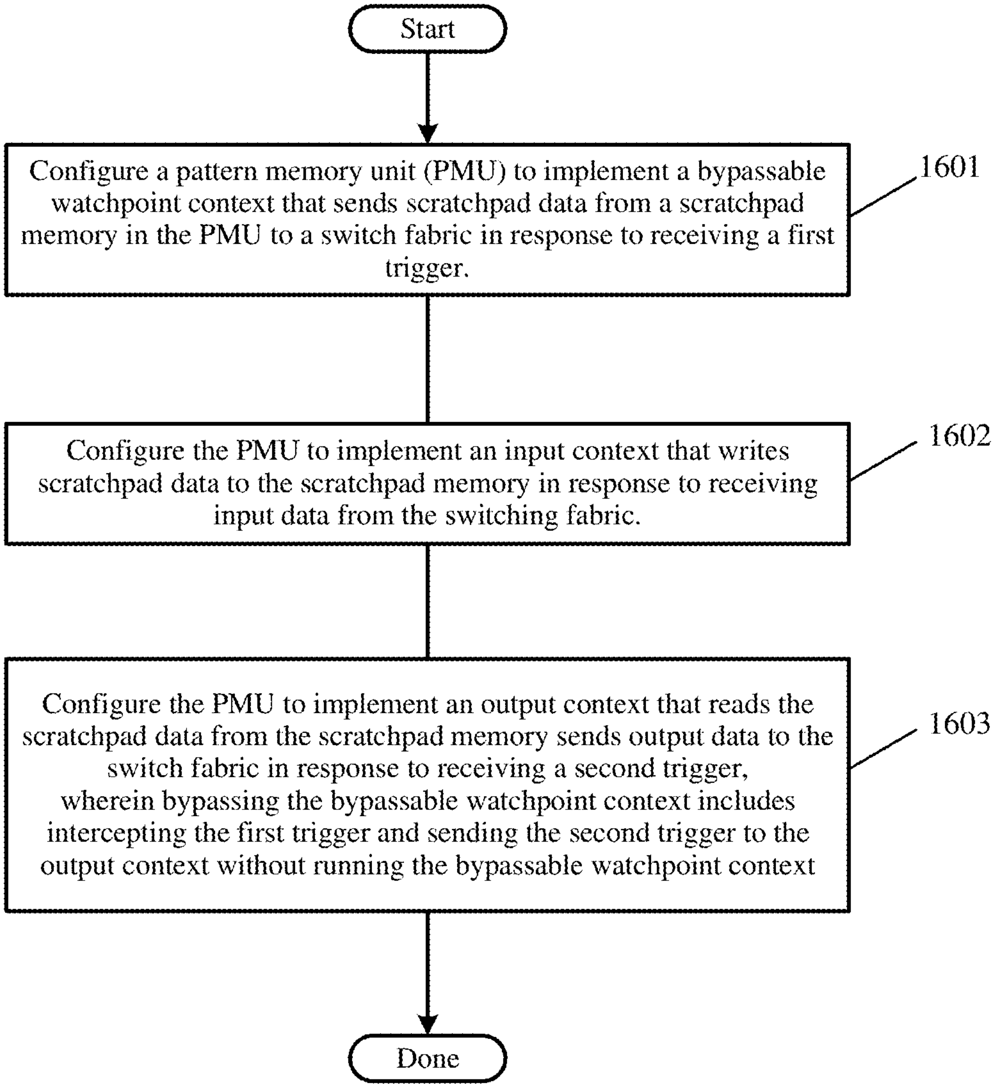
FIG. 16 is a high-level flow diagram illustrating an example of a method for implementing a bypassable watchpoint context in a PMU, according to some aspects.

FIG. 16 is a high-level flow diagram illustrating an example of a method for implementing a bypassable watchpoint context in a PMU, according to some aspects. At block 1601, a pattern memory unit (PMU) is configured to implement a bypassable watchpoint context that sends scratchpad data from a scratchpad memory in the PMU to a switch fabric in response to receiving a first trigger. At block 1602, the PMU is configured to implement an input context that writes scratchpad data to the scratchpad memory in response to receiving input data from the switch fabric. At block 1603, the PMU is configured to implement an output context that reads the scratchpad data from the scratchpad memory sends output data to the switch fabric in response to receiving a second trigger, wherein bypassing the bypassable watchpoint context includes intercepting the first trigger and sending the second trigger to the output context without running the bypassable watchpoint context.

Particular Implementations

Described implementations of the subject matter can include one or more features, alone or in combination, as described in the following clauses.

Clause 1. A system comprising a switch fabric, and a pattern memory unit (PMU) configured to implement a bypassable watchpoint context that sends scratchpad data from a scratchpad memory in the PMU to the switch fabric in response to receiving a first trigger, wherein the PMU is configured to implement an input context that writes the scratchpad data to the scratchpad memory in response to receiving input data from the switch fabric, the PMU is configured to implement an output context that reads the scratchpad data from the scratchpad memory sends output data to the switch fabric in response to receiving a second trigger, and bypassing the bypassable watchpoint context includes intercepting the first trigger and sending the second trigger to the output context without running the bypassable watchpoint context.

Clause 2. The system of clause 1, wherein running the bypassable watchpoint context includes the bypassable watchpoint context sending the scratchpad data to the switch fabric and sending the second trigger to the output context in response to receiving the first trigger.

Clause 3. The system of clause 1 or clause 2, further including a reorder buffer configured to receive the scratchpad data sent by the PMU, produce reordered scratchpad data by reordering the scratchpad data, and send the reordered scratchpad data to a consumer.

Clause 4. The system of clause 3, wherein the reorder buffer is configured to produce the reordered scratchpad data by combining and reordering scratchpad data received from a plurality of PMUs.

Clause 5. The system of any of the clauses 1 to 4, further including a second PMU configured to implement the reorder buffer by implementing a second input context that writes the scratchpad data to a second scratchpad memory in response to receiving the scratchpad data sent by the PMU, and implementing a second output context that sends the reordered scratchpad data to the consumer via the switch fabric.

Clause 6. The system of any of the clauses 1 to 5, wherein the second PMU is configured to produce the reordered scratchpad data by combining and reordering scratchpad data received from a plurality of PMUs.

Clause 7. The system of any of the clauses 1 to 6, further including a tile that includes the switch fabric, the PMU, and a communications port that implements the reorder buffer, wherein the communications port is configured to pass data between the switch fabric and a top-level network, and send the scratchpad data to the consumer via the top-level network.

Clause 8. The system of any of the clauses 1 to 7, wherein the communications port is configured to produce the reordered scratchpad data by combining and reordering scratchpad data received from a plurality of PMUs.

Clause 9. A method comprising configuring a pattern memory unit (PMU) to implement a bypassable watchpoint context that sends scratchpad data from a scratchpad memory in the PMU to a switch fabric in response to receiving a first trigger, configuring the PMU to implement an input context that writes the scratchpad data to the scratchpad memory in response to receiving input data from the switch fabric, and configuring the PMU to implement an output context that reads the scratchpad data from the scratchpad memory sends output data to the switch fabric in response to receiving a second trigger, wherein bypassing the bypassable watchpoint context includes intercepting the first trigger and sending the second trigger to the output context without running the bypassable watchpoint context.

Clause 10. The method of clause 9, wherein running the bypassable watchpoint context includes the bypassable watchpoint context sending the scratchpad data to the switch fabric and sending the second trigger to the output context in response to receiving the first trigger.

Clause 11. The method of clause 9 or clause 10, further including configuring a reorder buffer to receive the scratchpad data sent by the PMU, produce reordered scratchpad data by reordering the scratchpad data, and send the reordered scratchpad data to a consumer.

Clause 12. The method of any of the clauses 9 to 11, wherein the reorder buffer is configured to produce the reordered scratchpad data by combining and reordering scratchpad data received from a plurality of PMUs.

Clause 13. The method of any of the clauses 9 to 12, further including configuring a second PMU to implement the reorder buffer by implementing a second input context that writes the scratchpad data to a second scratchpad memory in response to receiving the scratchpad data sent by the PMU, and implementing a second output context that sends the reordered scratchpad data to the consumer via the switch fabric.

Clause 14. The method of any of the clauses 9 to 13, wherein the second PMU is configured to produce the reordered scratchpad data by combining and reordering scratchpad data received from a plurality of PMUs.

Clause 15. The method of any of the clauses 9 to 14, wherein a tile includes the switch fabric, the PMU, and a communications port, the communications port implements the reorder buffer, and the communications port is configured to pass data between the switch fabric and a top-level network, and send the scratchpad data to the consumer via the top-level network.

Clause 16. The method of any of the clauses 9 to 15, wherein the communications port is configured to produce the reordered scratchpad data by combining and reordering scratchpad data received from a plurality of PMUs.

Clause 17. A non-transitory computer readable medium storing computer readable instructions, that when executed on one or more processors implements a method comprising configuring a pattern memory unit (PMU) to implement a bypassable watchpoint context that sends scratchpad data from a scratchpad memory in the PMU to a switch fabric in response to receiving a first trigger, configuring the PMU to implement an input context that writes the scratchpad data to the scratchpad memory in response to receiving input data from the switch fabric, and configuring the PMU to implement an output context that reads the scratchpad data from the scratchpad memory sends output data to the switch fabric in response to receiving a second trigger, wherein bypassing the bypassable watchpoint context includes intercepting the first trigger and sending the second trigger to the output context without running the bypassable watchpoint context.

Clause 18. The non-transitory computer readable medium of clause 17, wherein running the bypassable watchpoint context includes the bypassable watchpoint context sending the scratchpad data to the switch fabric and sending the second trigger to the output context in response to receiving the first trigger.

Clause 19. The non-transitory computer readable medium of clause 17 or clause 18, wherein the method further includes configuring a reorder buffer to receive the scratchpad data sent by the PMU, produce reordered scratchpad data by reordering the scratchpad data, and send the reordered scratchpad data to a consumer.

Clause 20. The non-transitory computer readable medium of any of the clauses 17 to 19, wherein the reorder buffer is configured to produce the reordered scratchpad data by combining and reordering scratchpad data received from a plurality of PMUs.

A first example of accelerated deep learning is using a deep learning accelerator implemented in a CGRA to train a neural network. A second example of accelerated deep learning is using the deep learning accelerator to operate a trained neural network to perform inferences. A third example of accelerated deep learning is using the deep learning accelerator to train a neural network and subsequently perform inference with any one or more of the trained neural network, information from the trained neural network, and a variant of the same.

Examples of neural networks include fully connected neural networks (FCNNs), recurrent neural networks (RNNs), graph neural networks (GNNs), convolutional neural networks (CNNs), graph convolutional networks (GCNs), long short-term memory (LSTM) networks, autoencoders, deep belief networks, and generative adversarial networks (GANs).

An example of training a neural network is determining one or more weights associated with the neural network, such as by back-propagation in a deep learning accelerator. An example of making an inference is using a trained neural network to compute results by processing input data using the weights associated with the trained neural network. As used herein, the term 'weight' is an example of a 'parameter' as used in various forms of neural network processing. For example, some neural network learning is directed to determining parameters (e.g., through back-propagation) that are usable for performing neural network inferences.

A neural network processes data according to a dataflow graph comprising layers of neurons. Example layers of neurons include input layers, hidden layers, and output layers. Stimuli (e.g., input data) are received by an input layer of neurons and the computed results of the dataflow graph (e.g., output data) are provided by an output layer of neurons. Example hidden layers include rectified linear unit (ReLU) layers, fully connected layers, recurrent layers, graphical network layers, long short-term memory layers, convolutional layers, kernel layers, dropout layers, and pooling layers. A neural network may be conditionally and/or selectively trained. After being trained, a neural network may be conditionally and/or selectively used for inference.

Examples of ICs, or parts of ICs, which may be used as deep learning accelerators, are processors such as central processing unit (CPUs), CGR processor ICs, graphics processing units (GPUs), FPGAs, ASICs, application-specific instruction-set processor (ASIP), and digital signal processors (DSPs). The disclosed technology implements efficient distributed computing by allowing an array of accelerators (e.g., reconfigurable processors) attached to separate hosts to directly communicate with each other via buffers.

The technology disclosed can be practiced as a system, method, or article of manufacture. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the implementations described herein.

Although the description has been described with respect to particular implementations thereof, these particular implementations are merely illustrative, and not restrictive. The description may reference specific structural implementations and methods and does not intend to limit the technology to the specifically disclosed implementations and methods. The technology may be practiced using other features, elements, methods and implementations. Implementations are described to illustrate the present technology, not to limit its scope, which is defined by the claims. Those of ordinary skill in the art recognize a variety of equivalent variations in the description above.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

Although the description has been described with respect to particular implementations thereof, these particular implementations are merely illustrative, and not restrictive. For instance, many of the operations can be implemented in a CGRA system, a System-on-Chip (SoC), application-specific integrated circuit (ASIC), programmable processor, in a programmable logic device such as a field-programmable gate array (FPGA) or a graphics processing unit (GPU), obviating a need for at least part of the dedicated hardware. Implementations may be as a single chip, or as a multi-chip module (MCM) packaging multiple semiconductor dies in a single package. All such variations and modifications are to be considered within the ambit of the present disclosed technology the nature of which is to be determined from the foregoing description.

One or more implementations of the technology or elements thereof can be implemented in the form of a computer product, including a non-transitory computer-readable storage medium with computer usable program code for performing any indicated method steps and/or any configuration file for one or more RDUs to execute a high-level program. Furthermore, one or more implementations of the technology or elements thereof can be implemented in the form of an apparatus including a memory and at least one processor that is coupled to the memory and operative to perform exemplary method steps, and/or an RDU that is operative to execute a high-level program based on a configuration file. Yet further, in another aspect, one or more implementations of the technology or elements thereof can be implemented in the form of means for conducting one or more of the method steps described herein and/or executing a high-level program described herein. Such means can include (i) hardware module(s); (ii) software module(s) executing on one or more hardware processors; (iii) bit files for configuration of a CGR array; or (iv) a combination of aforementioned items.

Thus, while particular implementations have been described herein, latitudes of modification, various changes, and substitutions are intended in the foregoing disclosures, and it will be appreciated that in some instances some features of particular implementations will be employed without a corresponding use of other features without departing from the scope and spirit as set forth. Therefore, many modifications may be made to adapt a particular situation or material to the essential scope and spirit of the technology disclosed.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A system comprising:
a switch fabric; and
a pattern memory unit (PMU) configured to implement a bypassable watchpoint context that sends scratchpad data from a scratchpad memory in the PMU to the switch fabric in response to receiving a first trigger, wherein:
the PMU is configured to implement an input context that writes the scratchpad data to the scratchpad memory in response to receiving input data from the switch fabric;
the PMU is configured to implement an output context that reads the scratchpad data from the scratchpad memory sends output data to the switch fabric in response to receiving a second trigger; and
bypassing the bypassable watchpoint context includes intercepting the first trigger and sending the second trigger to the output context without running the bypassable watchpoint context.

2. The system of claim 1, wherein running the bypassable watchpoint context includes the bypassable watchpoint context sending the scratchpad data to the switch fabric and sending the second trigger to the output context in response to receiving the first trigger.

3. The system of claim 1, further including:
a reorder buffer configured to:
receive the scratchpad data sent by the PMU;
produce reordered scratchpad data by reordering the scratchpad data; and
send the reordered scratchpad data to a consumer.

4. The system of claim 3, wherein the reorder buffer is configured to produce the reordered scratchpad data by combining and reordering scratchpad data received from a plurality of PMUs.

5. The system of claim 3, further including:
a second PMU configured to implement the reorder buffer by:
implementing a second input context that writes the scratchpad data to a second scratchpad memory in response to receiving the scratchpad data sent by the PMU; and
implementing a second output context that sends the reordered scratchpad data to the consumer via the switch fabric.

6. The system of claim 5, wherein the second PMU is configured to produce the reordered scratchpad data by combining and reordering scratchpad data received from a plurality of PMUs.

7. The system of claim 3, further including:
a tile that includes the switch fabric, the PMU, and a communications port that implements the reorder buffer, wherein the communications port is configured to:
pass data between the switch fabric and a top-level network; and
send the scratchpad data to the consumer via the top-level network.

8. The system of claim 7, wherein the communications port is configured to produce the reordered scratchpad data by combining and reordering scratchpad data received from a plurality of PMUs.

9. A method comprising:
configuring a pattern memory unit (PMU) to implement a bypassable watchpoint context that sends scratchpad data from a scratchpad memory in the PMU to a switch fabric in response to receiving a first trigger;
configuring the PMU to implement an input context that writes the scratchpad data to the scratchpad memory in response to receiving input data from the switch fabric; and
configuring the PMU to implement an output context that reads the scratchpad data from the scratchpad memory sends output data to the switch fabric in response to receiving a second trigger,
wherein bypassing the bypassable watchpoint context includes intercepting the first trigger and sending the second trigger to the output context without running the bypassable watchpoint context.

10. The method of claim 9, wherein running the bypassable watchpoint context includes the bypassable watchpoint context sending the scratchpad data to the switch fabric and sending the second trigger to the output context in response to receiving the first trigger.

11. The method of claim 9, further including:
configuring a reorder buffer to:
receive the scratchpad data sent by the PMU;
produce reordered scratchpad data by reordering the scratchpad data; and
send the reordered scratchpad data to a consumer.

12. The method of claim 11, wherein the reorder buffer is configured to produce the reordered scratchpad data by combining and reordering scratchpad data received from a plurality of PMUs.

13. The method of claim 11, further including:
configuring a second PMU to implement the reorder buffer by:
implementing a second input context that writes the scratchpad data to a second scratchpad memory in response to receiving the scratchpad data sent by the PMU; and
implementing a second output context that sends the reordered scratchpad data to the consumer via the switch fabric.

14. The method of claim 13, wherein the second PMU is configured to produce the reordered scratchpad data by combining and reordering scratchpad data received from a plurality of PMUs.

15. The method of claim 11, wherein:
a tile includes the switch fabric, the PMU, and a communications port;
the communications port implements the reorder buffer; and
the communications port is configured to:
pass data between the switch fabric and a top-level network; and
send the scratchpad data to the consumer via the top-level network.

16. The method of claim 15, wherein the communications port is configured to produce the reordered scratchpad data by combining and reordering scratchpad data received from a plurality of PMUs.

17. A non-transitory computer readable medium storing computer readable instructions, that when executed on one or more processors implements a method comprising:
configuring a pattern memory unit (PMU) to implement a bypassable watchpoint context that sends scratchpad data from a scratchpad memory in the PMU to a switch fabric in response to receiving a first trigger;

configuring the PMU to implement an input context that writes the scratchpad data to the scratchpad memory in response to receiving input data from the switch fabric; and configuring the PMU to implement an output context that reads the scratchpad data from the scratchpad memory sends output data to the switch fabric in response to receiving a second trigger, wherein bypassing the bypassable watchpoint context includes intercepting the first trigger and sending the second trigger to the output context without running the bypassable watchpoint context.

18. The non-transitory computer readable medium of claim 17, wherein running the bypassable watchpoint context includes the bypassable watchpoint context sending the scratchpad data to the switch fabric and sending the second trigger to the output context in response to receiving the first trigger.

19. The non-transitory computer readable medium of claim 17, wherein the method further includes:

configuring a reorder buffer to:

receive the scratchpad data sent by the PMU;

produce reordered scratchpad data by reordering the scratchpad data; and send the reordered scratchpad data to a consumer.

20. The non-transitory computer readable medium of claim 19, wherein the reorder buffer is configured to produce the reordered scratchpad data by combining and reordering scratchpad data received from a plurality of PMUs.

* * * * *